United States Patent
Moldover et al.

(10) Patent No.: US 11,693,616 B2
(45) Date of Patent: Jul. 4, 2023

(54) SHORT SEGMENT GENERATION FOR USER ENGAGEMENT IN VOCAL CAPTURE APPLICATIONS

(71) Applicant: SMULE, INC., San Francisco, CA (US)

(72) Inventors: Jon Moldover, San Francisco, CA (US); David Steinwedel, San Francisco, CA (US); Jeffrey C. Smith, Atherton, CA (US); Perry R. Cook, Jacksonville, OR (US)

(73) Assignee: Smule, Inc., San Francisco, CA (US)

( * ) Notice: Subject to any disclaimer, the term of this patent is extended or adjusted under 35 U.S.C. 154(b) by 0 days.

(21) Appl. No.: 16/947,943

(22) Filed: Aug. 25, 2020

(65) Prior Publication Data

US 2021/0055905 A1    Feb. 25, 2021

Related U.S. Application Data

(60) Provisional application No. 62/891,412, filed on Aug. 25, 2019.

(51) Int. Cl.
*G06F 3/0484*      (2022.01)
*G06F 3/16*      (2006.01)
(Continued)

(52) U.S. Cl.
CPC .............. *G06F 3/16* (2013.01); *G06F 3/0482* (2013.01); *G06F 3/0484* (2013.01);
(Continued)

(58) Field of Classification Search
None
See application file for complete search history.

(56) References Cited

U.S. PATENT DOCUMENTS

| | | |
|---|---|---|
| 2013/0262999 A1 | 10/2013 | Hwang et al. |
| 2014/0149861 A1 | 5/2014 | Shih et al. |
| 2015/0255082 A1 | 9/2015 | Cook et al. |

FOREIGN PATENT DOCUMENTS

| | | |
|---|---|---|
| EP | 2 337 018 A1 | 6/2011 |
| WO | 2016/196987 A1 | 12/2016 |

OTHER PUBLICATIONS

"How to COLLAB for singing songs? StarMaker App Feature Guide" https://www.youtube.com/watch?v=ppqyG3IXs0E published on May 12, 2017.*

(Continued)

*Primary Examiner* — Rinna Yi
(74) *Attorney, Agent, or Firm* — Haynes and Boone, LLP

(57) ABSTRACT

User interface techniques provide user vocalists with mechanisms for solo audiovisual capture and for seeding subsequent performances by other users (e.g., joiners). Audiovisual capture may be against a full-length work or seed spanning much or all of a pre-existing audio (or audiovisual) work and in some cases may mix, to seed further contributions of one or more joiners, a user's captured media content for at least some portions of the audio (or audiovisual) work. A short seed or short segment may span less than all (and in some cases, much less than all) of the audio (or audiovisual) work. For example, a verse, chorus, refrain, hook or other limited "chunk" of an audio (or audiovisual) work may constitute a short seed or short segment. Computational techniques are described that allow a system to automatically identify suitable short seeds or short segments. After audiovisual capture against the short seed or short segment, a resulting, solo or group, full-length or short-form performance may be posted, livestreamed, or otherwise disseminated in a social network.

21 Claims, 21 Drawing Sheets

(51) Int. Cl.
    *G06F 3/0482*     (2013.01)
    *G10L 25/51*     (2013.01)
    *G06F 3/0488*     (2022.01)
    *G10L 25/90*     (2013.01)

(52) U.S. Cl.
    CPC ............ *G06F 3/0488* (2013.01); *G10L 25/51* (2013.01); *G10L 25/90* (2013.01); *G06F 2203/04808* (2013.01)

(56) References Cited

OTHER PUBLICATIONS

"How to Run Your Choir Efficiently With Choir Player" https://www.youtube.com/watch?v=KV9-4jLiE04&t=2s published on Oct. 21, 2016.*

"Sing! Karaoke, now with Video!" https://www.youtube.com/watch?v=dgvtyni8jHs published on Oct. 30, 2014.*

* cited by examiner

SHORT SEGMENT GENERATION FOR USER ENGAGEMENT IN VOCAL CAPTURE APPLICATIONS

RELATED APPLICATION(S)

The present application claims priority of U.S. Provisional Application No. 62/891,412 filed Aug. 25, 2019, entitled "SHORT SEED OR CLIP GENERATION FOR USER ENGAGEMENT IN VOCAL CAPTURE APPLICATIONS, naming Moldover, Steinwedel, Smith and Cook as inventors, the entirety of which is incorporated by reference herein.

BACKGROUND

Field of the Invention

The inventions relate generally to capture and/or processing of audiovisual performances and, in particular, to user interface techniques suitable for presenting a generated or selected short seed or short segment of a larger audio work for use in capturing and potentially manipulating media segments encoding audio and/or visual performances.

Description of the Related Art

The installed base of mobile phones, personal media players, and portable computing devices, together with media streamers and television set-top boxes, grows in sheer number and computational power each day. Hyper-ubiquitous and deeply entrenched in the lifestyles of people around the world, many of these devices transcend cultural and economic barriers. Computationally, these computing devices offer speed and storage capabilities comparable to engineering workstation or workgroup computers from less than ten years ago, and typically include powerful media processors, rendering them suitable for real-time sound synthesis and other musical applications. Indeed, some modern devices, such as iPhone®, iPad®, iPod Touch® and other iOS® or Android devices, support audio and video processing quite capably, while at the same time providing platforms suitable for advanced user interfaces.

Applications such as the Smule Ocarina™, Leaf Trombone®, I Am T-Pain™, AutoRap®, Smule (fka Sing! Karaoke™), Guitar! By Smule®, and Magic Piano® apps available from Smule, Inc. have shown that advanced digital acoustic techniques may be delivered using such devices in ways that provide compelling musical experiences. As researchers seek to transition their innovations to commercial applications deployable to modern handheld devices and media application platforms within the real-world constraints imposed by processor, memory and other limited computational resources thereof and/or within communications bandwidth and transmission latency constraints typical of wireless networks, significant practical challenges continue to present. Improved techniques and functional capabilities are desired, particularly relative to audiovisual content and user interfaces.

SUMMARY

It has been discovered that, despite practical limitations imposed by mobile device platforms and media application execution environments, audiovisual performances, including vocal music, may be captured and coordinated with audiovisual content, including performances of other users, in ways that create compelling user experiences. In some cases, the vocal performances of individual users are captured (together with performance synchronized video) on mobile devices in the context of a karaoke-style presentation of lyrics in correspondence with audible renderings of a backing track. For example, performance capture can be facilitated using user interface designs whereby a user vocalist is visually presented with lyrics and pitch cues and whereby a temporally synchronized audible rendering of an audio backing track is provided. Exemplary techniques, including exemplary techniques for capture, coordination and mixing of audiovisual content for geographically distributed performers, are detailed in commonly-owned U.S. Pat. No. 9,866,731, filed Oct. 30, 2015, entitled "COORDINATING AND MIXING AUDIOVISUAL CONTENT CAPTURED FROM GEOGRAPHICALLY DISTRIBUTED PERFORMERS," the entirety of which is incorporated herein by reference.

Building on these and related techniques, user interface improvements are envisioned to provide user vocalists with mechanisms for seeding subsequent performances by other users (e.g., joiners) and indeed for short-form solo audiovisual capture. In some cases, a seed may be a full-length seed spanning much or all of a pre-existing audio (or audiovisual) work and mixing, to seed further the contributions of one or more joiners, a user's captured media content for at least some portions of the audio (or audiovisual) work. In some cases, a short seed or short segment may be employed spanning less than all (and in some cases, much less than all) of the audio (or audiovisual) work. For example, a verse, chorus, refrain, hook or other limited "chunk" of an audio (or audiovisual) work may constitute a collaboration seed in some cases or embodiments. Likewise, such limited "chunks" of an audio (or audiovisual) work may support solo, short-form audiovisual capture.

Such a short seed or short segment may be computationally generated based on a variety of inputs that are indexed (or indexable) to an audio or audiovisual work. For example, temporal extent of a short seed or short segment (as a portion or subset of the more complete audio or audiovisual work) may be computed by processing a set of vocal captures of user performances against the audio or audiovisual work. Loudness or spectral energy measures and/or pitch or timing correspondence with a vocal pitch track may be used select or threshold representative performances for inclusion in a sample or to weight contributions of individual performances of such a sample in the computation. Joint (sing together) portions the audio or audiovisual work can provide high levels of user engagement. Accordingly, the computational methods described herein may optionally be applied to select or favorably weight portions in the audio or audiovisual work that users have captured in duet or multipart chorus. Likewise, textual analysis of an associated lyrics track may be employed to identify repetition indicative of elements of musical structure such as chorus, refrain, hook or other repeated feature. In some cases, elements of musical structure may be associated (or associable) with the audio or audiovisual work based on user curation, upload metadata or professional or computationally-mediated annotations of a MIDI-encoded performance timeline.

Whatever the extent or scope of the seed, a seeding user may optionally ask (or call) others to join. Typically, a call invites other users to join the full-length or short form seed or clip by singing along, singing a particular vocal part or musical section, singing harmony or other duet part, rapping, talking, clapping, recording video, adding a video clip from camera roll, etc. The resulting group performance, whether full-length or just a chunk, may be posted, livestreamed, or otherwise disseminated in a social network.

In some cases or embodiments, portions of a performance timeline (often portions that correspond to musical sections) may be marked and labelled for user selection. Marking/labeling may be based on human or automated sources. For example, particular portions may be marked or labelled by a user that originally uploads a track or corresponding lyrics or by a media content curator. In a complementary fashion or alternatively, particular portions may be marked or labelled by a machine learning robot trained to identify section and boundaries (e.g., from an audio backing or vocal track, lyrics or based on crowd-sourced data such as where user tend to sing the most or most loudly).

In addition, it is envisioned that collaboration features may be provided to allow users to contribute media content and/or other temporally synchronized information to an evolving performance timeline. To facilitate collaboration and/or accretion of content, a shared service platform may expose media content and performance timeline data as a multi-user concurrent access database. Alternatively or additionally, particularly once a performance timeline has been at least partially defined with seed audio or video, collaboration may be facilitated through posting (e.g., via the shared service platform or otherwise in a peer-to-peer manner) of the performance timeline for joins by additional users who may, in turn, capture, edit and accrete to the performance timeline additional media segments, lyric information, pitch tracks, vocal part designations, and/or media segment-based or performance/style/genre-mapped audio or video effects/filters. In some cases, additional captures, edits and accretions to the performance timeline are accomplished using the user interface and platform features described herein to facilitate non-linear media segment capture and edit of audiovisual content and data for karaoke-style performances.

These and other user interface improvements will be understood by persons of skill in the art having benefit of the present disclosure in connection with other aspects of an audiovisual performance capture system. Optionally, in some cases or embodiments, vocal audio can be pitch-corrected in real-time at the mobile device (or more generally, at a portable computing device such as a mobile phone, personal digital assistant, laptop computer, notebook computer, pad-type computer or netbook) or on a content or media application server in accord with pitch correction settings. In some cases, pitch correction settings code a particular key or scale for the vocal performance or for portions thereof. In some cases, pitch correction settings include a score-coded melody and/or harmony sequence supplied with, or for association with, the lyrics and backing tracks. Harmony notes or chords may be coded as explicit targets or relative to the score coded melody or even actual pitches sounded by a vocalist, if desired.

Based on the compelling and transformative nature of the pitch-corrected vocals, performance synchronized video and score-coded harmony mixes, user/vocalists may overcome an otherwise natural shyness or angst associated with sharing their vocal performances. Instead, even geographically distributed vocalists are encouraged to share with friends and family or to collaborate and contribute vocal performances as part of social music networks. In some implementations, these interactions are facilitated through social network- and/or eMail-mediated sharing of performances and invitations to join in a group performance. In some implementations, livestreaming may be supported. Living room-style, large screen user interfaces may facilitate these interactions. Using uploaded vocals captured at clients such as the aforementioned portable computing devices, a content server (or service) can mediate such coordinated performances by manipulating and mixing the uploaded audiovisual content of multiple contributing vocalists. Depending on the goals and implementation of a particular system, in addition to video content, uploads may include pitch-corrected vocal performances (with or without harmonies), dry (i.e., uncorrected) vocals, and/or control tracks of user key and/or pitch correction selections, etc.

Social music can be mediated in any of a variety of ways. For example, in some implementations, a first user's vocal performance, captured against a backing track at a portable computing device and typically pitch-corrected in accord with score-coded melody and/or harmony cues, is supplied to other potential vocal performers as a seed. Performance synchronized video is also captured and may be supplied with the pitch-corrected, captured vocals. The supplied vocals are mixed with backing instrumentals/vocals and form the backing track for capture of a second user's vocals. Often, successive vocal contributors are geographically separated and may be unknown (at least a priori) to each other, yet the intimacy of the vocals together with the collaborative experience itself tends to minimize this separation. As successive vocal performances and video are captured (e.g., at respective portable computing devices) and accreted as part of the social music experience, the backing track against which respective vocals are captured may evolve to include previously captured vocals of other contributors.

In some cases, a complete performance, or a complete performance of a particular vocal part (e.g., Part A or B in duet), may constitute the seed for a social music collaboration. However, using techniques described herein, capture of even small or isolated portions of an overall performance, e.g., a refrain, hook, intro, outro, duet or group part, verse or other limited portion, section or select selected segment of a larger performance may be conveniently captured, re-captured, or edited for use as a collaboration seed, regardless of whether it constitutes a complete performance timeline. In some cases, select sections, locations or pre-marked/labeled segment boundaries may correspond to elements of musical structure. As a result, embodiments in accordance with the present invention(s) may facilitate "short seed" collaboration mechanics in a social music network of geographically distributed performers.

In some cases, captivating visual animations and/or facilities for listener comment and ranking, as well as duet, glee club or choral group formation or accretion logic are provided in association with an audible rendering of a vocal performance (e.g., that captured and pitch-corrected at another similarly configured mobile device) mixed with backing instrumentals and/or vocals. Synthesized harmonies and/or additional vocals (e.g., vocals captured from another vocalist at still other locations and optionally pitch-shifted to harmonize with other vocals) may also be included in the mix. Audio or visual filters or effects may be applied or reapplied post-capture for dissemination or posting of content. In some cases, disseminated or posted content may take the form of a collaboration request or open call for additional vocalists. Geocoding of captured vocal performances (or individual contributions to a combined performance) and/or listener feedback may facilitate animations or display artifacts in ways that are suggestive of a performance or endorsement emanating from a particular geographic locale on a user-manipulable globe. In these ways, implementations of the described functionality can transform otherwise mundane mobile devices and living room or entertainment systems into social instruments that foster a unique sense of global connectivity, collaboration and community.

In some embodiments in accordance with the present invention(s), a system includes plural media capture devices communicatively coupled via respective network communication interfaces for collaboration between at least respective pairs of performers relative to a baseline media encoding of an audio work. A first one of the media capture devices provides a first user thereof with a user interface for selecting from amongst performance capture options that include the full audio work and a seed partial portion (or clip) thereof. The first media capture device is configured to capture at least vocal audio of the first user performed against an audible rendering on the first media capture device of the selected full or seed partial portion (or clip) of the audio work. A second one of the media capture devices is configured (i) to receive, via its network communications interface, an indication of the full or seed partial portion (or clip) selected by the first user at the first media capture device and (ii) to capture media content of a second user performed against an audible rendering on the second media capture device of the selected full or seed partial portion (or clip) of the audio work mixed with the captured vocal audio of the first user.

In some cases or embodiments, temporal extent of the seed partial portion (or clip) is determined, at least in part, based on computational evaluation of vocal captures of plural user performances against audible renderings of the audio work on respective of the media capture devices to identify a particular portion of the full audio work against which pluralities of the users sing together. In some cases or embodiments, temporal extent of the seed partial portion (or clip) is determined, at least in part, based on computational evaluation of vocal captures of plural user performances against audible renderings of the audio work on respective of the media capture devices to identify a particular portion of the full audio work against which individual users sing most loudly or with greatest pitch or timing correspondence with a vocal pitch track for the audio work.

In some cases or embodiments, temporal extent of the seed partial portion (or clip) is determined, at least in part, based on computational analysis of a lyric track for the audio work to identify repetition indicative of a chorus, refrain, hook or other repeated vocal element. In some cases or embodiments, temporal extent of the seed partial portion (or clip) is determined, at least in part, based on music information retrieval (MIR) features extracted from at least a backing track of the audio work to identify similarity indicative of a chorus, refrain, hook or other recurring or distinctive elements of musical structure. In some cases or embodiments, temporal extent of the seed partial portion (or clip) is determined, at least in part, based on visual features extracted from performance synchronized video.

In some cases or embodiments, temporal extent of the seed partial portion is determined, at least in part, based on measured performer or non-performer user engagement indicia. In some cases or embodiments, the measured performer or non-performer user engagement indicia include one or more of: (i) points or portions of interest at which users opt to listen to user performances captured against an audible rendering of the audio work; (ii) points or portions of interest for which users express a love or like using a social media mechanic; (iii) points or portions of interest identified based on an aggregated superposition of user applause measures temporally indexed to the audio work; and (iv) points or portions of interest for which users initiate a chat, forward a clip or initiate a vocal capture.

In some cases or embodiments, temporal extent of the seed partial portion (or clip) is determined, at least in part, based on user curation or uploader metadata capture that labels or marks particular portions of the audio work.

In some cases or embodiments, the user interface of the first media capture device further allows the first user to specify one or more types of media content to be captured from the second user's performance against the audible rendering on the second media capture device of the selected full or seed partial portion (or clip) mixed with the captured vocal audio of the first user. In some cases or embodiments, the specified one or more types of media content to be captured are selected from a set that includes: (i) vocal audio, vocal harmony or a vocal duet part; (ii) rap, talk, clap or percussion; and (iii) video.

In some cases or embodiments, the user interface of the first media capture device further allows the first user to post the selected full or seed partial portion (or clip) to other geographically-distributed users, including the second user, and media capture devices as a collaboration request for capture and addition of further vocal audio, video or performance synchronized audiovisual content.

In some embodiments, the system further includes a service platform communicatively coupled and configured to identify and supply at least the seed partial portion (or clip) of the audio work to the first and second media capture devices. In some embodiments, the system further includes, on the first media capture device, a user interface by which the first user selects the seed partial portion (or clip) from amongst pre-marked or labeled portions of the audio work. In some cases or embodiments, the pre-marked or labeled portions of the audio work are supplied by a service platform communicatively coupled to the first and second media capture devices, the pre-marked or labeled portions having been marked or labelled based on one or more of: (i) musical structure coded for the audio work; (ii) a machine learning algorithm applied to backing audio, vocal audio or lyrics of or corresponding to the audio work; (iii) crowd-sourced data; and (iv) data supplied by a user uploader of the audio work or by a third-party curator thereof.

In some cases or embodiments, the baseline media encoding of the audio work further encodes synchronized video content. In some cases or embodiments, the first media capture device is further configured to capture performance synchronized video content. In some cases or embodiments, the first and second media capture device are mobile phone-type portable computing devices executing application software that, in at least one operating mode thereof, provide a karaoke-style presentation of a performance timeline including lyrics on a multi-touch sensitive display thereof in temporal correspondence with audible rendering of the audio work and that captures the respective first or second user's vocal and/or performance synchronized video via on-board audio and video interfaces the respective mobile phone-type portable computing device.

In some embodiments in accordance with the present inventions, a method includes presenting a user interface option at a media capture device communicatively coupled via a network communication interface for vocal performance capture relative to a baseline media encoding of an audio work. The presented user interface option allows the user to select from amongst performance capture options that include the full audio work and a clip or seed partial portion thereof, the first media capture device configured to capture at least vocal audio of the first user performed against an audible rendering on the first media capture device of the selected full or partial portion of the audio work. Temporal extent of the partial portion is determined, at least in part, based on computational evaluation of vocal captures of plural user performances against audible renderings of the audio work on respective other media capture devices to identify a particular portion of the full audio work against which pluralities of the users sing together.

In some embodiments, the method further includes supplying to at least a second media capture device via the network communications interface, an indication of the partial portion selected by the first user at the first media capture device as a seed for capture of media content of a second user performed against an audible rendering on the second media capture device of the selected seed partial portion (or clip) of the audio work mixed with the captured vocal audio of the first user.

In some cases or embodiments, the temporal extent of the partial portion is determined, at least in part, based on computational evaluation of vocal captures of plural user performances against audible renderings of the audio work on respective media capture devices to identify a particular portion of the full audio work against which pluralities of the users sing together. In some cases or embodiments, the temporal extent of the partial portion is determined, at least in part, based on computational evaluation of vocal captures of plural user performances against audible renderings of the audio work on respective media capture devices to identify a particular portion of the full audio work against which individual users sing most loudly or with greatest pitch or timing correspondence with a vocal pitch track for the audio work. In some cases or embodiments, the temporal extent of the partial portion is determined, at least in part, based on computational analysis of a lyric track for the audio work to identify repetition indicative of a chorus, refrain, hook or other repeated vocal element. In some cases or embodiments, the temporal extent of the partial portion is determined, at least in part, based on music information retrieval (MIR) features extracted from at least a backing track of the audio work to identify similarity indicative of a chorus, refrain, hook or other recurring or distinctive elements of musical structure.

In some cases or embodiments, the temporal extent of the partial portion capture option is determined, at least in part, based on measured performer or non-performer user engagement indicia. In some cases or embodiments, the measured performer or non-performer user engagement indicia include one or more of: (i) points or portions of interest at which users opt to listen to user performances captured against an audible rendering of the audio work; (ii) points or portions of interest for which users express a love or like using a social media mechanic; (iii) points or portions of interest identified based on an aggregated superposition of user applause measures temporally indexed to the audio work; and (iv) points or portions of interest for which users initiate a chat, forward a clip or initiate a vocal capture In some cases or embodiments, the temporal extent of the partial portion is determined, at least in part, based on user curation or uploader metadata capture that labels or marks particular portions of the audio work.

In some embodiments in accordance with the present invention(s), a system includes a service platform and plural media capture devices. The plural media capture devices are communicatively coupled via respective network communications interfaces to the service platform for media capture relative to a media encoding of an audio work. The media capture devices provide respective users thereof with a user interface for selecting from amongst performance capture options that include one or more partial portions of the audio work identified to the respective media capture devices by the service platform. The service platform identifies individual ones of the partial portions based on one or more of: (i) musical structure coded for the audio work; (ii) a machine learning algorithm applied to backing audio, vocal audio or lyrics of or corresponding to audiovisual performances captured against the audio work; and (iii) crowd-sourced point- or portion-of-interest data measured for performer and/or non-performer user engagement with the audio work. The media capture devices are configured to capture at least vocal audio of the respective users performed against audible renderings on the respective media capture devices of respectively selected partial portions of the audio work.

In some cases or embodiments, the performance capture options selectable by the respective users include the full audio work. In some cases or embodiments, the performance capture options selectable by the respective users at respective of the media capture devices include multiple individual partial portions of the audio work identified by the service platform. In some cases or embodiments, the performance capture options selectable by the respective users at respective of the media capture devices include a user-defined join of multiple of the partial portions of the audio work identified by the service platform, the user-defined join constituting less than the full audio work.

In some cases or embodiments, temporal extent of the identified one or more partial portions is determined, at least in part, based on computational evaluation of vocal captures of plural user performances against audible renderings of the audio work on respective of the media capture devices to identify particular portions of the full audio work against which pluralities of the users sing together. In some cases or embodiments, temporal extent of the identified one or more partial portions is determined, at least in part, based on computational evaluation of vocal captures of plural user performances against audible renderings of the audio work on respective of the media capture devices to identify particular portions of the full audio work against which individual users sing most loudly or with greatest pitch or timing correspondence with a vocal pitch track for the audio work.

In some cases or embodiments, temporal extent of the identified one or more partial portions is determined, at least in part, based on computational analysis of a lyric track for the audio work to identify repetition indicative of a chorus, refrain, hook or other repeated vocal element. In some cases or embodiments, temporal extent of the identified one or more partial portions is determined, at least in part, based on music information retrieval (MIR) features extracted from at least a backing track of the audio work to identify similarity indicative of a chorus, refrain, hook or other recurring or distinctive elements of musical structure.

In some cases or embodiments, temporal extent of the identified one or more partial portions is determined, at least in part, based on visual features extracted from performance synchronized video. In some cases or embodiments, temporal extent of the identified one or more partial portions is determined, at least in part, based on measured performer or non-performer user engagement indicia.

In some cases or embodiments, the measured performer or non-performer user engagement indicia include one or more of: (i) points or portions of interest at which users opt to listen to user performances captured against an audible rendering of the audio work; (ii) points or portions of interest for which users express a love or like using a social media mechanic; (iii) points or portions of interest identified based on an aggregated superposition of user applause measures temporally indexed to the audio work; and (iv) points or portions of interest for which users initiate a chat, forward a clip or initiate a vocal capture.

In some cases or embodiments, temporal extent of the identified one or more partial portions is determined, at least in part, based on user curation or uploader metadata capture that labels or marks particular portions of the audio work.

In some cases or embodiments, the partial portion selected by a first user at a first one of the media capture devices is communicated to a second one of the media capture devices as a seed partial portion against which a second user of the second media capture device captures media content.

BRIEF DESCRIPTION OF THE DRAWINGS

The present invention(s) are illustrated by way of examples and not limitation with reference to the accompanying figures, in which like references generally indicate similar elements or features.

Skilled artisans will appreciate that elements or features in the figures are illustrated for simplicity and clarity and have not necessarily been drawn to scale. For example, the dimensions or prominence of some of the illustrated elements or features may be exaggerated relative to other elements or features in an effort to improve understanding of embodiments of the present invention.

DETAILED DESCRIPTION

Techniques have been developed to facilitate the capture, pitch correction, compositing, encoding and rendering of audiovisual performances. Vocal audio together with performance synchronized video may be captured and coordinated with audiovisual contributions of other users to form multi-performer, duet-style or glee club-style audiovisual performances. Nonlinear capture and/or edit of individual segments or portions of a performance timeline allows freeform collaboration of multiple contributors, typically with independent and geographically-distributed audio and/or video capture. In some cases, audio and video may be separately captured and associated after capture. In some cases, the performances of individual users (audio, video or, in some cases, audio together with performance synchronized video) are captured on mobile devices, television-type display and/or set-top box equipment in the context of karaoke-style presentations of lyrics in correspondence with audible renderings of a backing track or vocal performance. Captured audio, video or audiovisual content of one contributor may serve as a seed for a group performance.

Karaoke-Style Vocal Performance Capture

Figure 1:
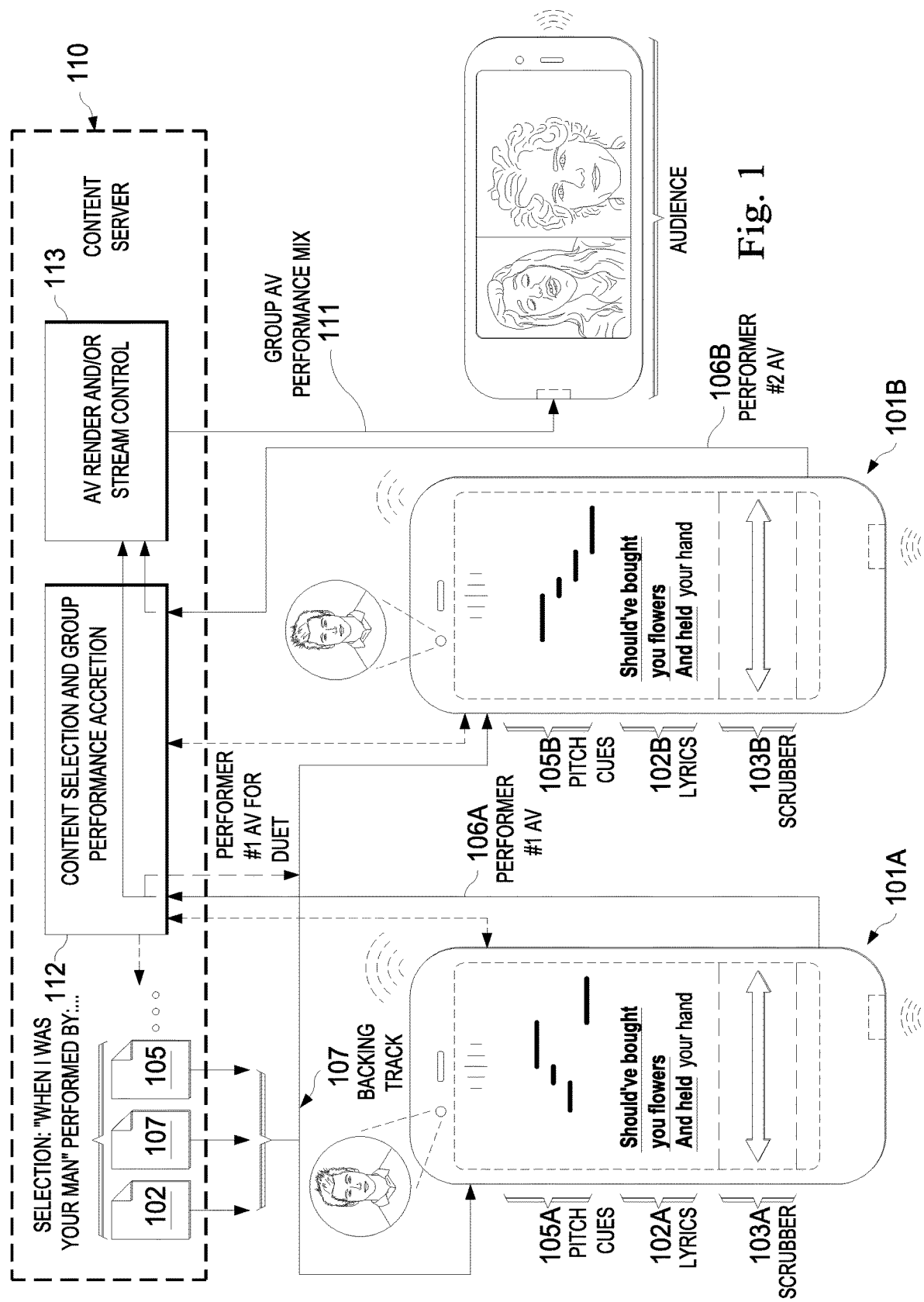
FIG. 1 depicts information flows amongst illustrative mobile phone-type portable computing devices employed for non-linear audiovisual capture and/or edit in preparation of a group audiovisual performance in accordance with some embodiments of the present invention(s).

FIG. 1 depicts information flows amongst illustrative mobile phone-type portable computing devices (101A, 101B) and a content server 110 in accordance with some embodiments of the present invention(s). In the illustrated flows, lyrics 102, pitch cues 105 and a backing track 107 are supplied to one or more of the portable computing devices (101A, 101B) to facilitate vocal (and in some cases, audiovisual) capture. User interfaces of the respective devices provide a scrubber (103A, 103B), whereby a given user-vocalist is able to move forward and backward through temporally synchronized content (e.g., audio, lyrics, pitch cues, etc.) using gesture control on a touchscreen. In some cases, scrubber control also allows forward and backward movement through performance-synchronized video.

Although embodiments of the present invention are not limited thereto, pitch-corrected, karaoke-style, vocal capture using mobile phone-type provides a useful descriptive context. For example, in some embodiments consistent with that illustrated in FIG. 1, an iPhone™ handheld available from Apple Inc. (or more generally, a portable computing device 101A, 101B) hosts software that executes in coordination with a content server 110 to provide vocal capture, often with continuous real-time, score-coded pitch correction and/or harmonization of the captured vocals. Performance synchronized (or performance-synchronizable) video may be captured using a camera provided using an on-board camera. In some embodiments, audio, video and/or audiovisual content may be captured using, or in connection with, a camera or cameras configured with a television (or other audiovisual equipment) or connected set-top box equipment (not specifically shown in FIG. 1). In some embodiments, traditional desk/laptop computers may be appropriately configured and host an application or web application to support some of the functions described herein.

Capture of a two-part performance is illustrated (e.g., as a duet in which audiovisual content 106A and 106B is separately captured from individual vocalists); however, persons of skill in the art having benefit of the present disclosure will appreciate that techniques of the present invention may also be employed in solo and in larger multipart performances. In general, audiovisual content may be posted, streamed, or may initiate or be captured in response to a collaboration request. In the illustrated embodiment, content selection, group performances and dissemination of captured audiovisual performances are all coordinated via content server 110. A content selection and performance accretion module 112 of content server 110 performs audio mixing and video stitching in the illustrated design, while audiovisual render/stream control module 113 supplies group audiovisual performance mix 111 to a downstream audience. In other embodiments, peer-to-peer communications may be employed for at least some of the illustrated flows.

In some cases, a wireless local area network may support communications between a portable computing device 101A instance, audiovisual and/or set-top box equipment, and a wide-area network gateway (not specifically shown) that, in turn, communicates with a remote device 101B and/or content server 110. Although FIG. 1 depicts a configuration in which content server 110 plays an intermediating role between portable computing devices 101A and 101B, persons of skill in the art having benefit of the present disclosure will appreciate that peer-to-peer or host-to-guest communication between portable computing devices 101A and 101B may also, or alternatively, be supported. Persons of skill in the art will recognize that any of a variety of data communications facilities, including 802.11 Wi-Fi, Bluetooth™, 4G-LTE, 5G, or other communications, wireless, wired data networks, and/or wired or wireless audiovisual interconnects may be employed, individually or in combination, to facilitate communications and/or audiovisual rendering described herein.

As is typical of karaoke-style applications (such as the Smule app available from Smule, Inc.), a backing track of instrumentals and/or vocals can be audibly rendered for a user/vocalist to sing against. In such cases, lyrics may be displayed (102A, 102B) in correspondence with local audible rendering to facilitate a karaoke-style vocal performance by a given user. Note that, in general, individual users may perform the same or different parts in a group performance and that audio or audiovisual captures need not be, and typically are not, simultaneous. In some embodiments, audio or audiovisual capture of performer contributions may be independent and asynchronous, often spanning time zones and continents. However, in some embodiments, live streaming techniques may be employed. In the illustrated configuration of FIG. 1, lyrics, timing information, pitch and harmony cues, backing tracks (e.g., instrumentals/vocals), performance coordinated video, etc. may all be sourced from a network-connected content server 110. In some cases or situations, backing audio and/or video may be rendered from a media store such as a music library that is resident or accessible from the handheld, set-top box, content server, etc.

User vocal or audiovisual content 106A, 106B is captured at respective devices 101A, 101B, optionally pitch-corrected continuously and in real-time (either at the handheld or using computational facilities of audiovisual display and/or set-top box equipment not specifically shown) and audibly rendered to provide the user with an improved tonal quality rendition of his/her own vocal performance. Pitch correction is typically based on score-coded note sets or cues (e.g., pitch and harmony cues 105), which provide continuous pitch-correction algorithms with performance synchronized sequences of target notes in a current key or scale. In addition to performance synchronized melody targets, score-coded harmony note sequences (or sets) provide pitch-shifting algorithms with additional targets (typically coded as offsets relative to a lead melody note track and typically scored only for selected portions thereof) for pitch-shifting to harmony versions of the user's own captured vocals. In some embodiments, note/pitch targets and score-coded timing information may be used to evaluate vocal performance quality.

Lyrics 102, melody and harmony track note sets 105 and related timing and control information may be encapsulated in an appropriate container or object (e.g., in a Musical Instrument Digital Interface, MIDI, or Java Script Object Notation, json, type format) for supply together with the backing track 107. Using such information, portable computing devices 101A, 101B may display lyrics (102A, 102B) and even visual cues (105A, 105B) related to target notes, harmonies and currently detected vocal pitch in correspondence with an audible performance of the backing track(s) so as to facilitate a karaoke-style vocal performance by a user. Thus, if an aspiring vocalist selects "When I Was Your Man" as popularized by Bruno Mars, your_man.json and your_man.m4a may be downloaded from the content server (if not already available or cached based on prior download) and, in turn, used to provide background music, synchronized lyrics and, in some situations or embodiments, score-coded note tracks for continuous, real-time pitch-correction while the user sings. Optionally, at least for certain embodiments or genres, harmony note tracks may be score coded for harmony shifts to captured vocals.

Typically, a captured pitch-corrected (possibly harmonized) vocal performance together with performance synchronized video is saved locally, on the handheld device or set-top box, as one or more audio or audiovisual files and is subsequently compressed and encoded for upload (106A, 106B) to content server 110 as MPEG-4 container files. While MPEG-4 is an exemplary standard for the coded representation and transmission of digital multimedia content for the Internet, mobile networks and advanced broadcast applications, other suitable codecs, compression techniques, coding formats and/or containers may be employed, if desired. Depending on the implementation, encodings of dry vocal and/or pitch-corrected vocals may be uploaded (106A, 106B) to content server 110. In general, such vocals (encoded, e.g., in an MPEG-4 container or otherwise)

whether already pitch-corrected or pitch-corrected at content server 110 can then be mixed, e.g., with backing audio and other captured (and possibly pitch shifted) vocal performances, to produce files or streams of quality or coding characteristics selected accord with capabilities or limitations a particular target or network. In some embodiments, audio processing and mixing and/or video synchronization and stitching to provide a composite, multi-performer, audiovisual work may be performed at a server or service platform such as content server 110.

Non-Linear Segment Capture and/or Edit

Figure 2:
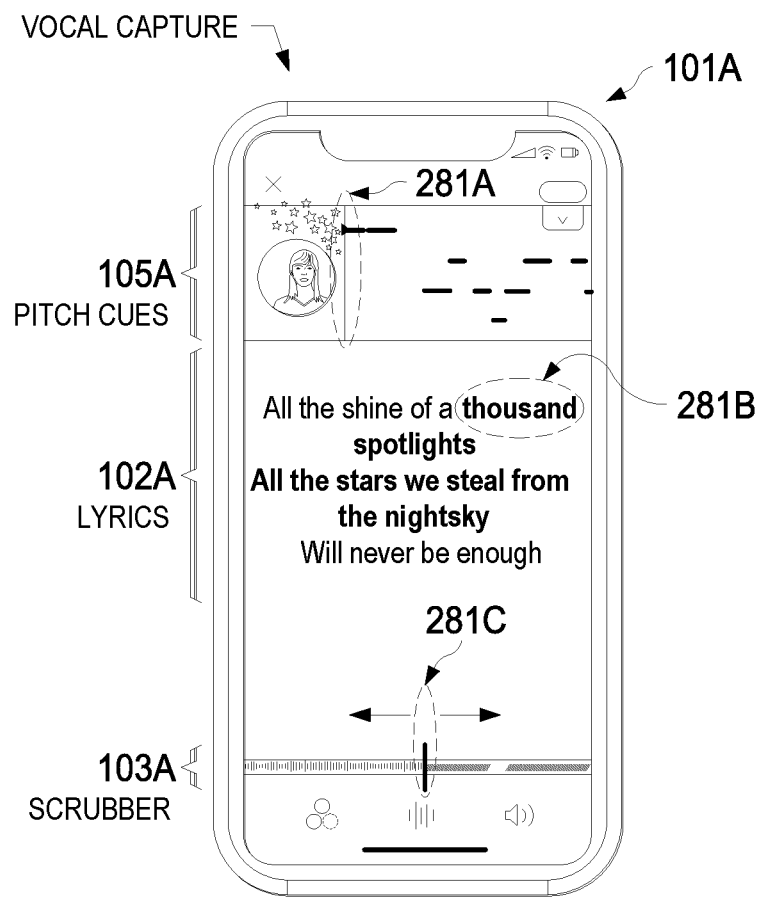
FIG. 2 depicts in somewhat greater detail an exemplary user interface with visually synchronized presentation of lyrics, pitch cues and a scrubber in connection with a vocal capture session on portable computing device.

FIG. 2 depicts in somewhat greater detail an exemplary user interface presentation of lyrics 102A, pitch cues 105A and a scrubber 103A in connection with a vocal capture session on portable computing device 101A (recall FIG. 1). A current vocal capture point is notated (281A, 281B, 281C) in multiple frames of reference (e.g., in lyrics 102A, in pitch cues 105A and in the audio envelope depiction of a performance timeline in scrubber 103A). Any of a variety of notation techniques or symbology may be employed. In general, particular forms of user interface notation and symbology are matters of design choice, but may include color cues (such as for word, line or syllable position 281B in lyrics 102A), vertical or horizontal bar markers (see notations 281A, 281C in pitch cue 105A and scrubber 103A portions of the FIG. 2 user interface presentation), or otherwise.

As will be understood with reference to subsequent drawings and description, the exemplary user interface presentation of FIG. 2 (and variations thereon) provides a mechanism whereby the user may move forward or backward in a performance timeline based on on-screen gesture control. By manipulating a current position 281C forward or backward in scrubber 103A, vocal capture point is correspondingly moved forward or backward in the performance timeline. Correspondingly, lyrics 102A and pitch cues 105A advance or rewind in a visually synchronized manner. Likewise, position in backing tracks and/or captured audio, video or audiovisual content is advanced or rewound. In this way, an on-screen user interface manipulation by the user of portable computing device 101A moves forward or backward and facilitates non-linear traversal of the performance timeline. For example, rather than starting vocal, video or audiovisual capture at the beginning of a performance timeline or resuming at a most recent stop or pause position, the user may move forward or backward to an arbitrary point in the performance timeline. Re-recording, overdubbing, and/or selectively capturing only particular sections or portions of a performance are all facilitated by the provided non-linear access. In some embodiments, non-linear access allows audio and video to be captured in separate passes.

A current position 281C in scrubber 103A, which is visually presented as an audio envelope of the performance timeline, is laterally-manipulable with leftward (temporally backward) and rightward (temporally forward) swipe-type gestures on the touchscreen display of portable computing device 101A. User interface gesture conventions are matters of design choice, and other gestures may be employed to similar or complementary effect, if desired. In some embodiments, current position may also (or alternatively) be manipulated with gestures in pitch track 105A or lyrics 102A panes of the display. In each case, presentations of the on-screen elements (e.g., pitch track 105A, lyrics 102A, and audio envelope of the performance timeline) are visually synchronized such that forward or backward movement of one results in corresponding forward or backward movement of the other(s). If and when capture is started or restarted, each of the on-screen elements (e.g., pitch track 105A, lyrics 102A, and audio envelope of the performance timeline) roll forward in temporal correspondence from a coherent, visually synchronized starting point within the performance timeline. In embodiments or display modes that provide for performance-synchronized video, video roll or capture may optionally be initiated at the visually synchronized starting point within the performance timeline.

Figure 3:
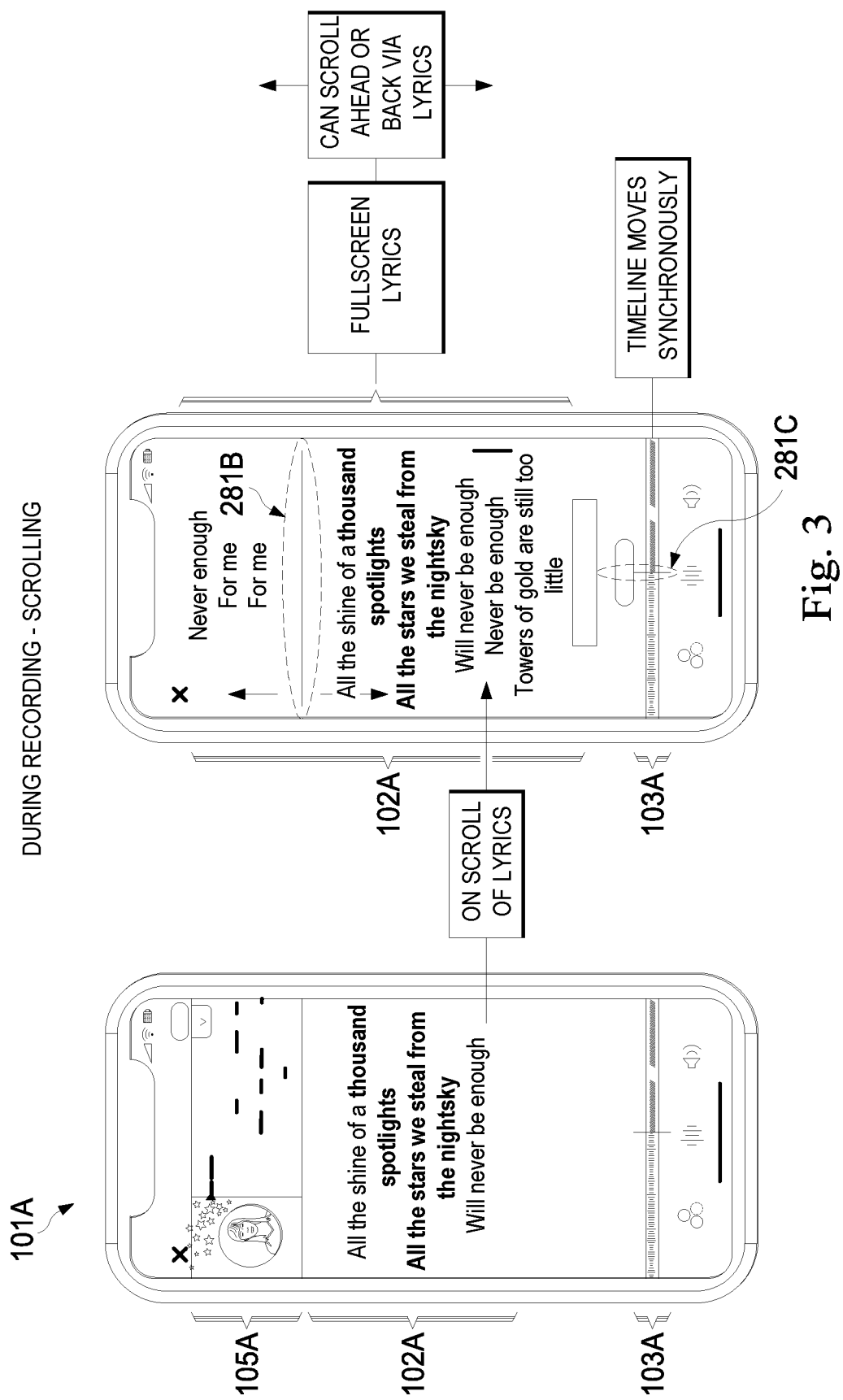
FIG. 3 illustrates an exemplary user interface in connection with a vocal capture scrolling behavior wherein a current point in the presentations of lyrics and the performance timeline moves forward or backward in correspondence with gestures by a user on a touchscreen of the portable computing device.

FIG. 3 illustrates another exemplary user interface mechanic in connection with a vocal capture scrolling behavior wherein a current point (281B) in the presentations of lyrics 102A and its corresponding point (281C) in the performance timeline moves forward or backward in correspondence with gestures by a user on a touchscreen of portable computing device 101A (recall FIG. 1). Although an expanded presentation of lyrics 102A is provided and pitch cues are hidden in the illustrated embodiment, other embodiments may allocate screen real estate differently. User interface gestures for forward and backward scrolling through lyrics are expressed by the user-vocalist in connection with the on-screen presentation of lyrics using upward or downward movement on the touchscreen of portable computing device 101A (recall FIG. 1). In some situations or embodiments, fine-grain (line-, word- or syllable-level) movement through the lyrics with visually synchronized traversal of other displayed features (e.g., audio envelope of scrubber 103A) may be a preferred mechanism for performance timeline traversal by a user vocalist during capture or recapture. As before, the touchscreen gestures provide synchronized movement through lyrics 102A and the performance timeline. Additional or alternative gesture expressions may be employed in some embodiments.

While exemplary user interface features emphasize lyrics and pitch cues, elements of musical structure such as segments, group parts, part A/B in duet, etc. may also be used to mark points in a performance timeline to which a current position may be advanced or rewound. In some cases or embodiments, advance may be automated or scripted. In some cases, user interfaces may support a "seek" to next or previous point of musical structure significance, to a selected segment or location, or to a pre-marked/labeled segment boundary.

Figure 4:
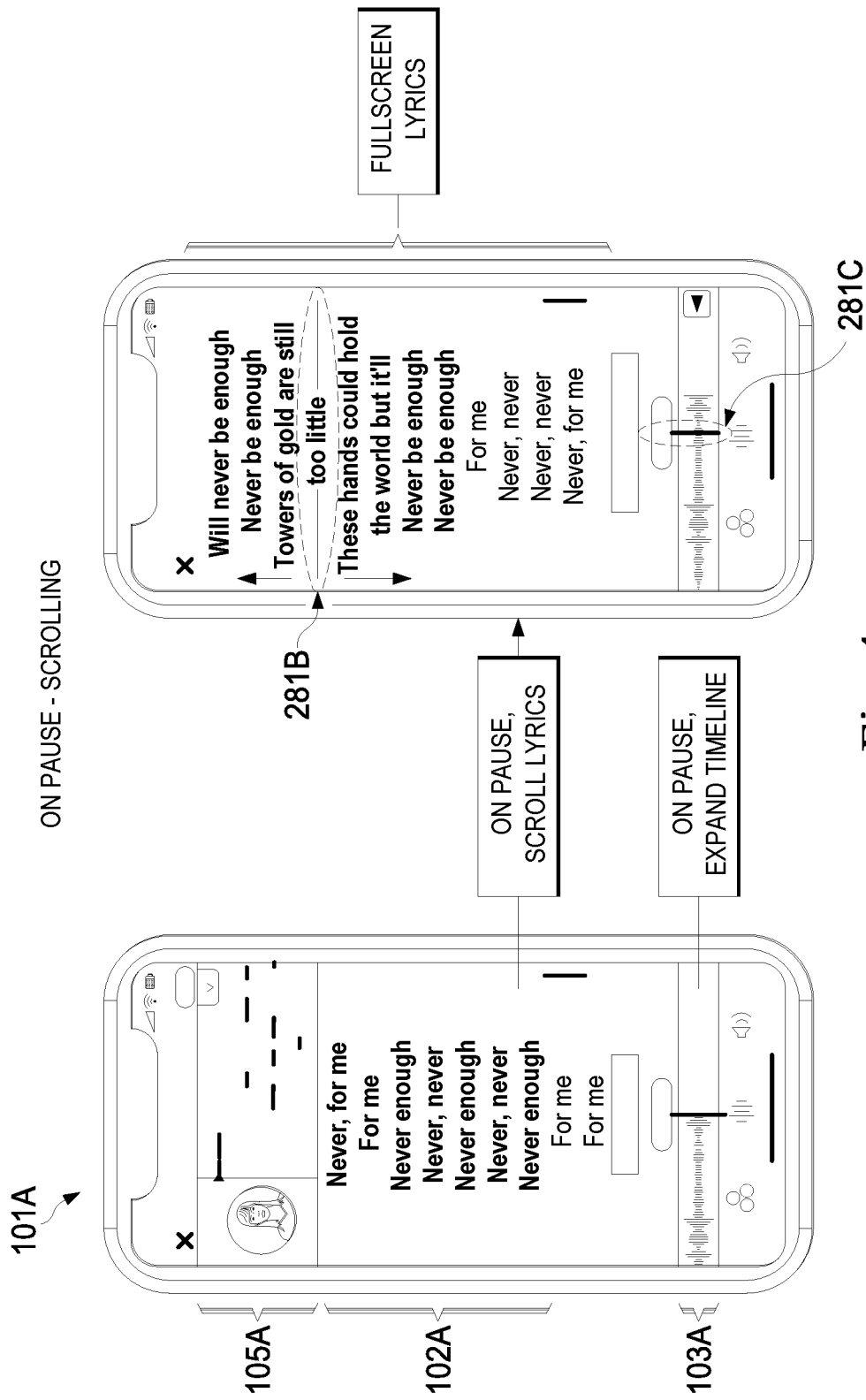
FIG. 4 illustrates an exemplary user interface in connection with a pause in vocal capture.

FIG. 4 illustrates similar user interface features in connection with a pause in vocal capture wherein a current point (281B) in the presentations of lyrics 102A and its corresponding point (281C) in the performance timeline moves forward or backward in correspondence with gestures by a user on a touchscreen of portable computing device 101A (recall FIG. 1). On pause, an expanded presentation of the performance timeline is presented in scrubber 103A. As before, a current point in the presentations of lyrics 102A and of timeline scrubber 103A moves forward or backward in correspondence with upward or downward touchscreen gestures by the user. Forward and backward movement through the features presented on screen (e.g., lyrics 102A and performance timeline) is temporally synchronized. User selections of lyrics may be employed to designate a vocal portion for subsequent joins and to seed media content (e.g., audio and/or video) for a collaboration request.

Figure 5:
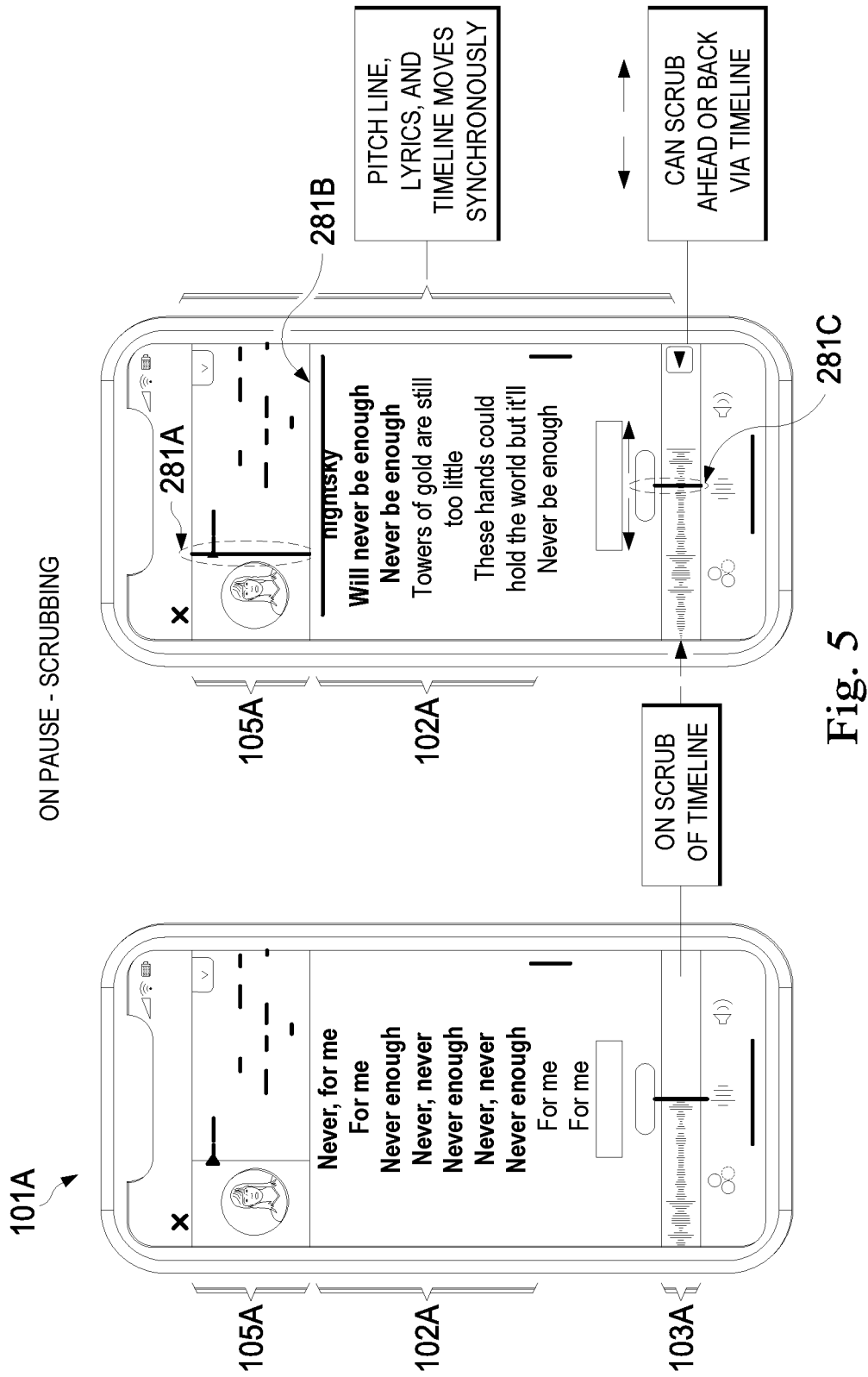
FIG. 5 illustrates another exemplary user interface with a scrubber to move forward or backward in correspondence with gestures by a user on a touchscreen of portable computing device.

FIG. 5 illustrates scrubbing using timeline scrubber 103A wherein a current point (281C) and its corresponding points (281B, 281A) in the presentations of lyrics 102A and pitch cues 105A move forward or backward in correspondence with gestures by a user on a touchscreen of portable computing device 101A (recall FIG. 1). The touchscreen gestures provide synchronized movement through lyrics 102A, pitch cues 105A and the performance timeline. Additional or alternative gesture expressions may be employed in some embodiments.

Figure 6:
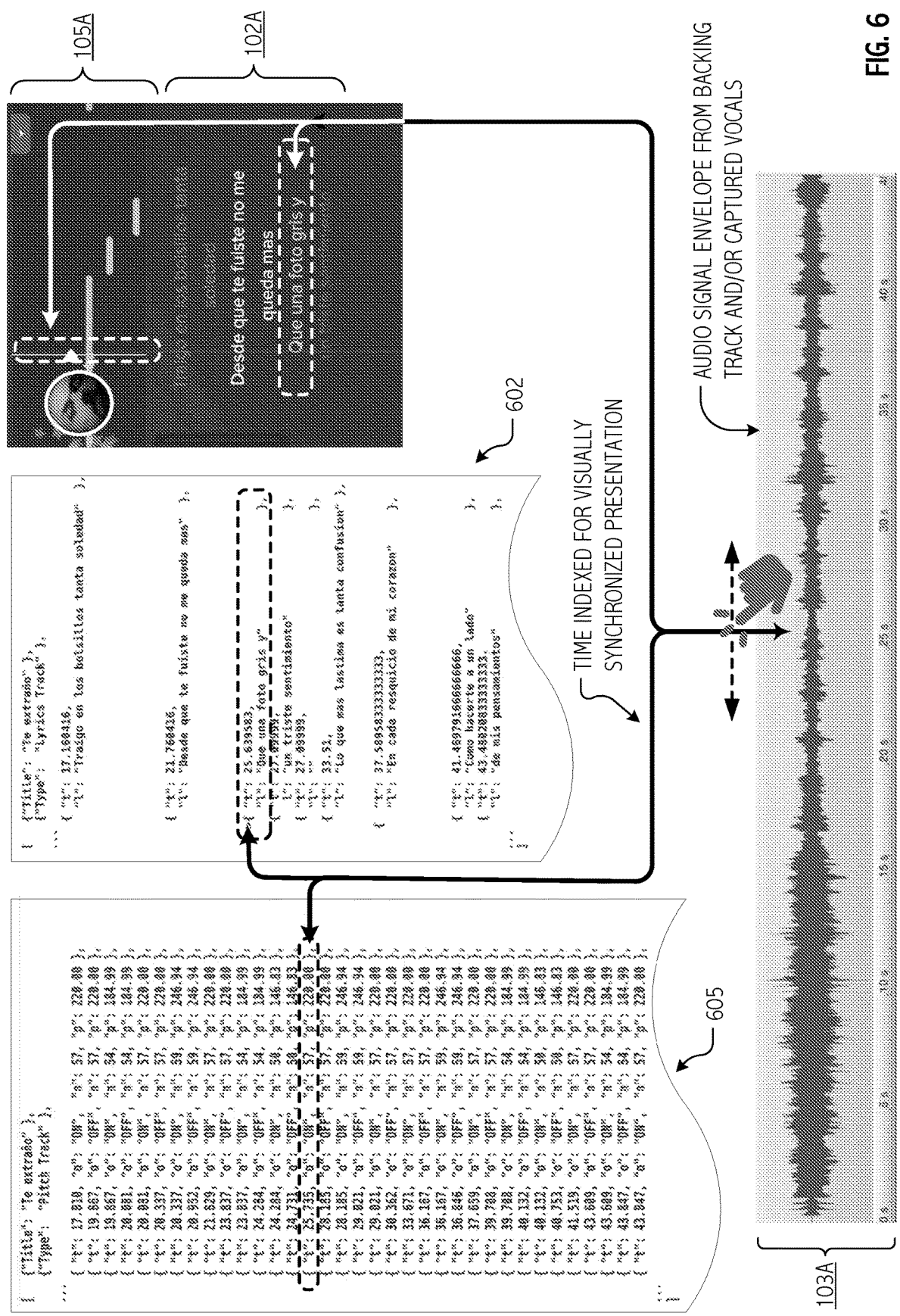
FIG. 6 illustrates a time-indexed traversal mechanism in accordance with some embodiments of the present inventions.

FIG. 6 illustrates time-indexed traversal of computer-readable encodings of pitch track 605 and lyrics track 602 data in connection with forward and backward user interface gestures expressed by a user on a touch screen display of an illustrative audio signal envelope computed from backing track and/or captured vocals. In general, MIDI, json or other suitable in-memory data representation formats may be employed for pitch, lyrics, musical structure and other information related to a given performance or musical arrangement. Persons of skill in the art having benefit of the present disclosure will appreciate use of any of a variety of data structure indexing techniques to facilitate visually synchronized presentation of a position in a performance timeline, e.g., using scrubber 103A, lyrics 102A and pitch cue 105A portions of a display.

Figure 7:
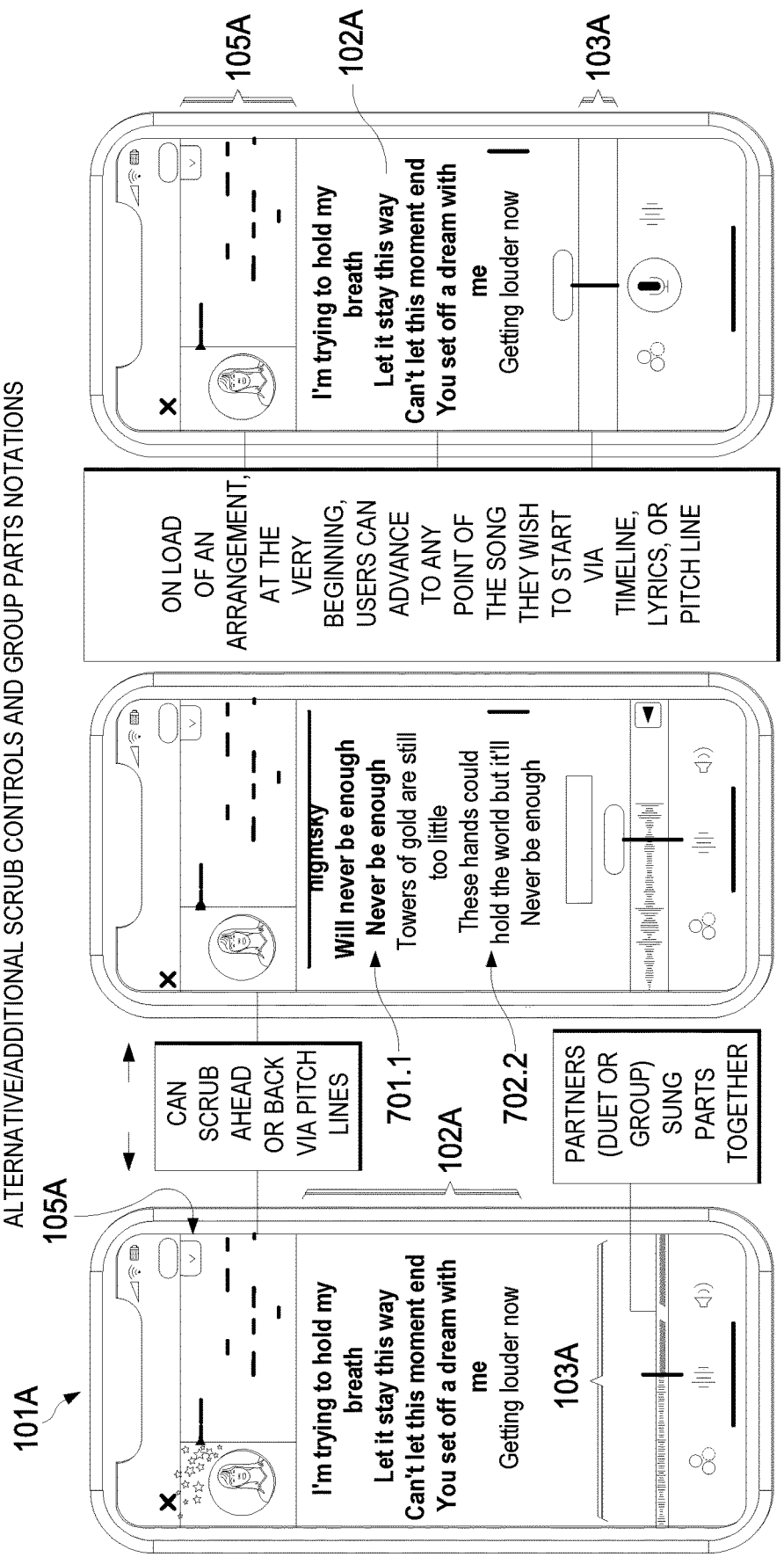
FIG. 7 illustrates some illustrative variations on the scrubbing mechanism(s) introduced with reference to some of the preceding drawings.

FIG. 7 illustrates some illustrative variations on the scrubbing mechanism(s) introduced with reference to the preceding drawings. Specifically, in one illustrated variation, scrubbing is alternatively (or additionally) supported based on side-to-side gestures in the pitch cue presentation portion (105A) of the touchscreen. As before, movement through lyrics (102A) and traversal of an audio signal envelope presentation of the performance timeline (103A) are visually synchronized with the pitch cue-based scrubbing. Vocal parts (e.g., lyrics 701.1, 702.2) for individual user vocalists may be notated in the performance timeline such as through an alternate color of other on-screen symbology. Similar symbology may be employed in pitch cue 105A and timeline scrubber 103A portions of the user interface to identify duet (Part A, Part B) or group parts sung or to-be-sung by individual vocalists. In some cases or embodiments, user interface facilities may be provided that advance/rewind to, or select, points of musical structure significance along the performance timeline. Examples include musical section boundaries, successive starts of a next Part A (or Part B) section in a duet, particular musical sections that have been assigned to a user vocalist as part of a collaboration request, etc. Upon loading a musical arrangement, user interfaces and scrubbing mechanisms in accordance with some embodiments of the present inventions allow users to advance/rewind to, or even select, an arbitrary or demarked point, section or segment in the arrangement for vocal, video and/or audiovisual capture, re-capture or playback using performance timeline, lyrics or pitch portions of the visually synchronized presentation.

Figure 8:
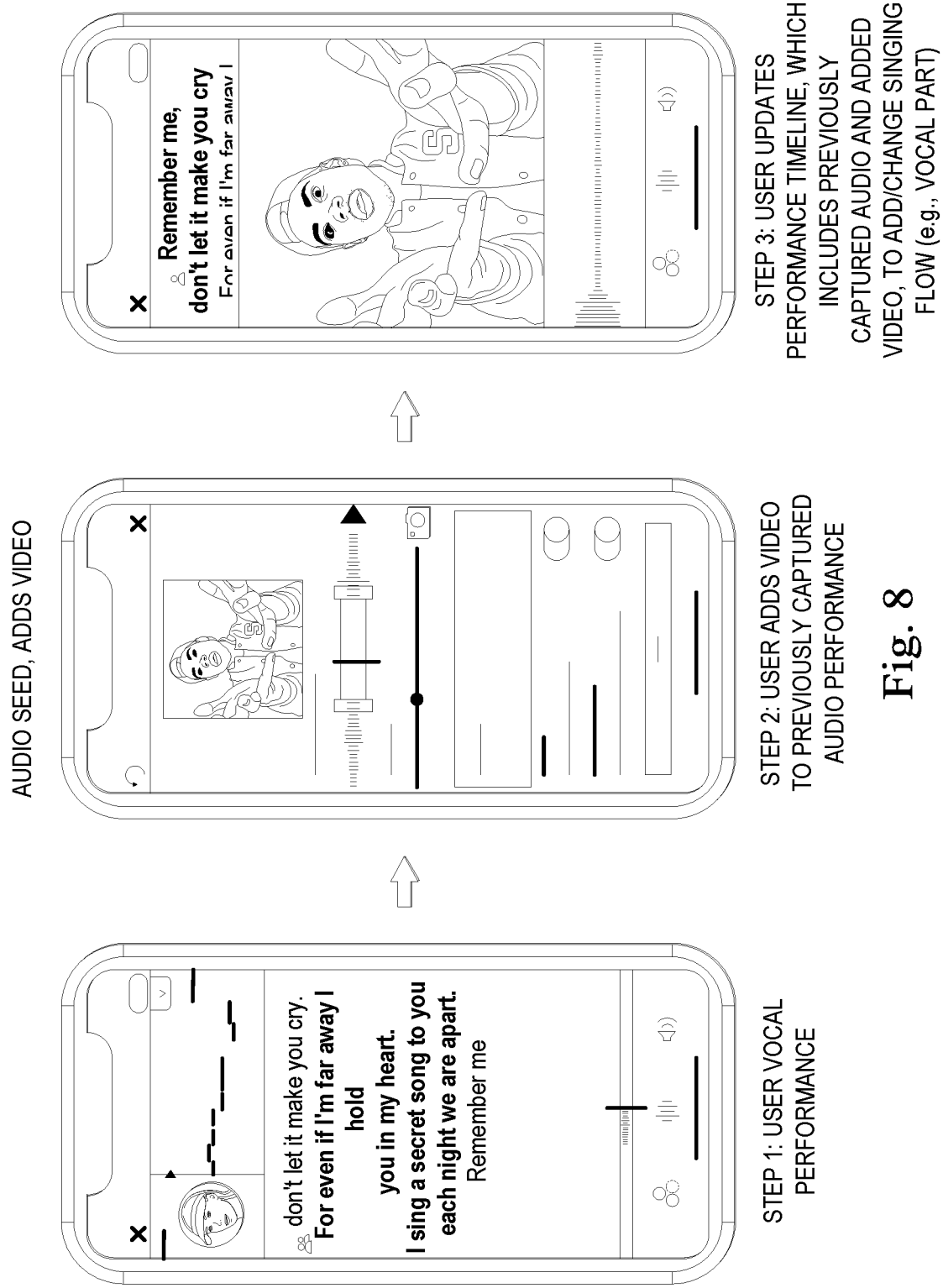
FIG. 8 illustrates use of a captured vocal performance as an audio seed, to which a user adds video, and finally updates a performance timeline to add or change a flow or a vocal part selection.
Figure 9:
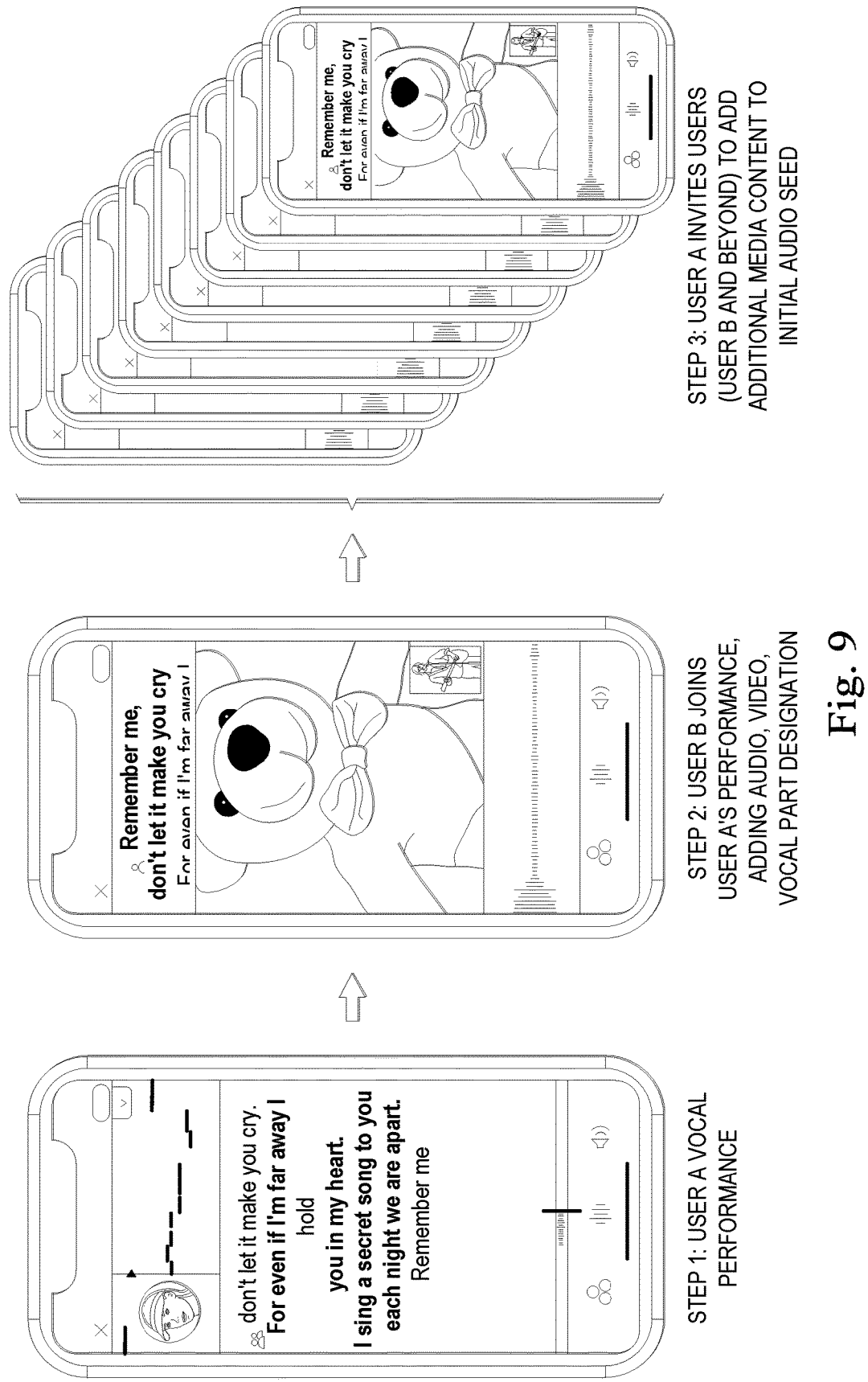
FIG. 9 depicts an illustrative sequence that includes an additional multi user collaboration aspect.

FIG. 8 illustrates use of a captured vocal performance as an audio seed, to which a user adds video, and finally updates a performance time to add or change a flow or a vocal part selection. FIG. 9 depicts an illustrative sequence that includes an additional multi user collaboration aspect. For example, after a first user (user A) captures a vocal performance as an audio seed, a second user (user B) joins user A' performance and adds audio and/or video media segments. In the illustrative sequence, user B also adds a vocal part designation, such as by notating particular lyrics as part B of a duet. From there, multiple potential joiners are invited (e.g., as part of an open call) to add additional media content to user A's initial audio seed with the added audio, video and in accordance with vocal part designation by user B. Consistent with the illustration of FIG. 18, the seeding first user (user A) may select a clip/short seed option (rather than full song) as the audio baseline for her/his vocal capture. Computational techniques for generating such a clip/short seed for the first user (user A) or even for a solo performer are described herein. In addition, user interface techniques are described for allowing a seeding first user (user A) to self-specify such a short seed (or clip).

Figure 10:
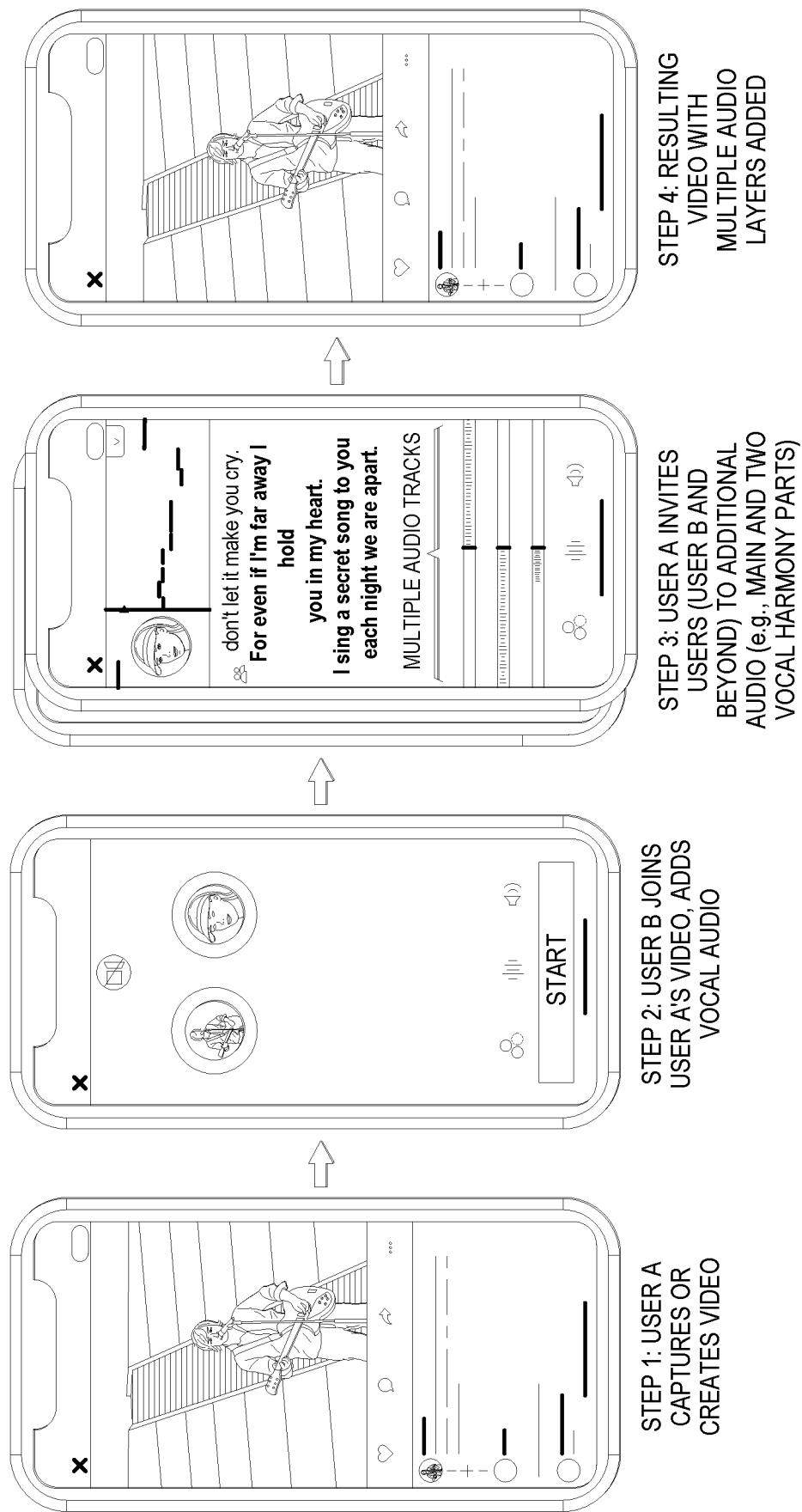
FIG. 10 depicts an illustrative sequence with multi-user collaboration involving video created or captured by a user as an initial seed performance.

FIG. 10 depicts a similar sequence with multi-user collaboration, but in which video created or captured by a first user (user A) is provided as an initial seed performance. A second user (user B) joins user A's video and adds an audio segment, here captured vocal audio. User A, in turn, invites users (e.g., user B and others) to add additional audio, here main audio (melody) and two additional vocal harmony parts. The result is video with multiple audio layers added as a collaboration.

Figure 11:
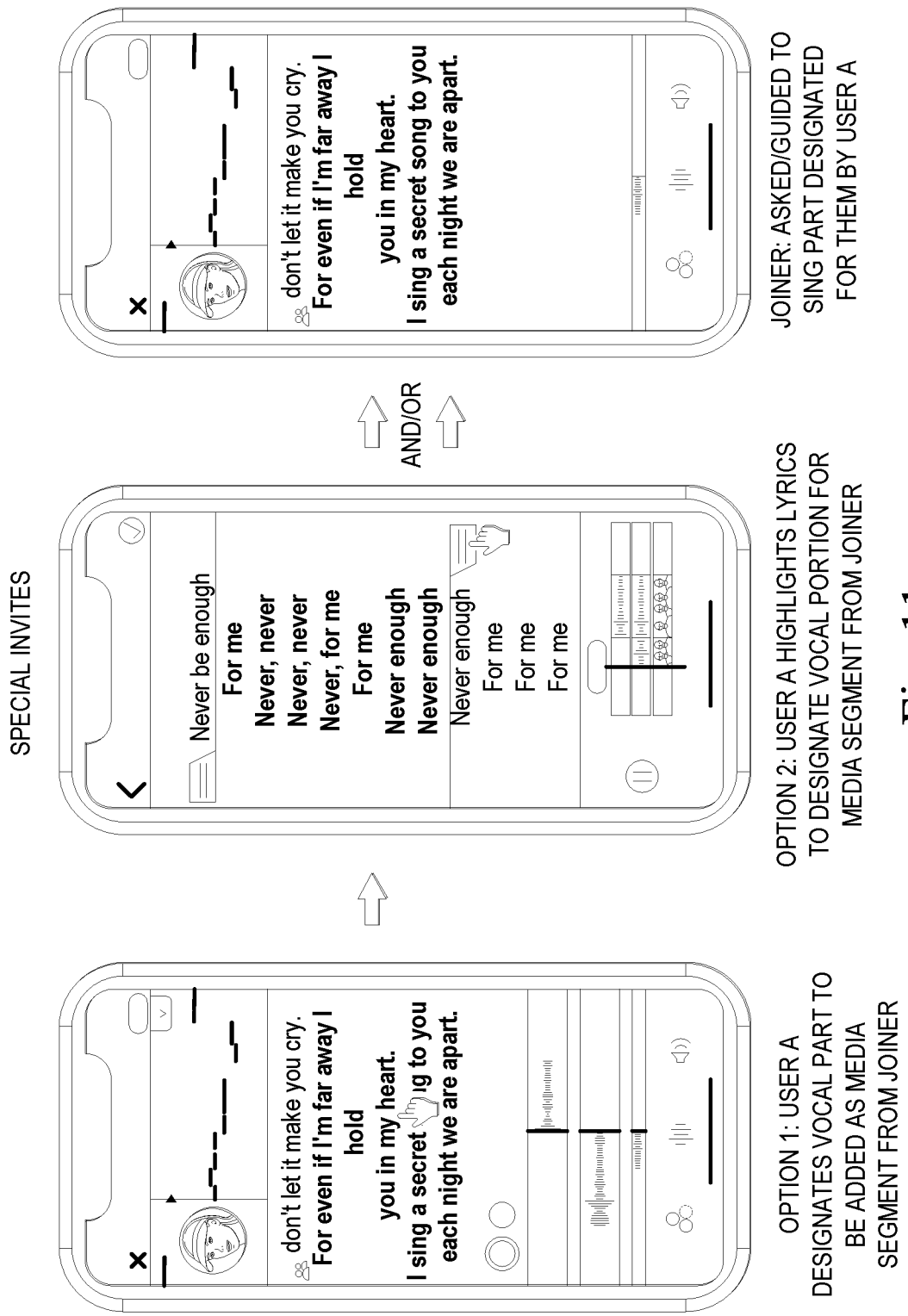
FIG. 11 depicts exemplary special invite options including user designation of a particular vocal part for which a joiner is guided to sing or provide audio.

FIG. 11 depicts certain exemplary special invite options including user designation of a particular vocal part for subsequent joins and user selection of lyrics to designate a vocal portion for subsequent joins to seed media content (e.g., audio and/or video). In each case, the joiner is guided to sing, or more generally to provide audio for, the designated vocal portion.

Figure 12A:
FIGS. 12A and 12B (together referred to herein as FIG. 12) depict freestyle creation of an arrangement in accordance with some embodiments of the present invention(s).
Figure 12B:
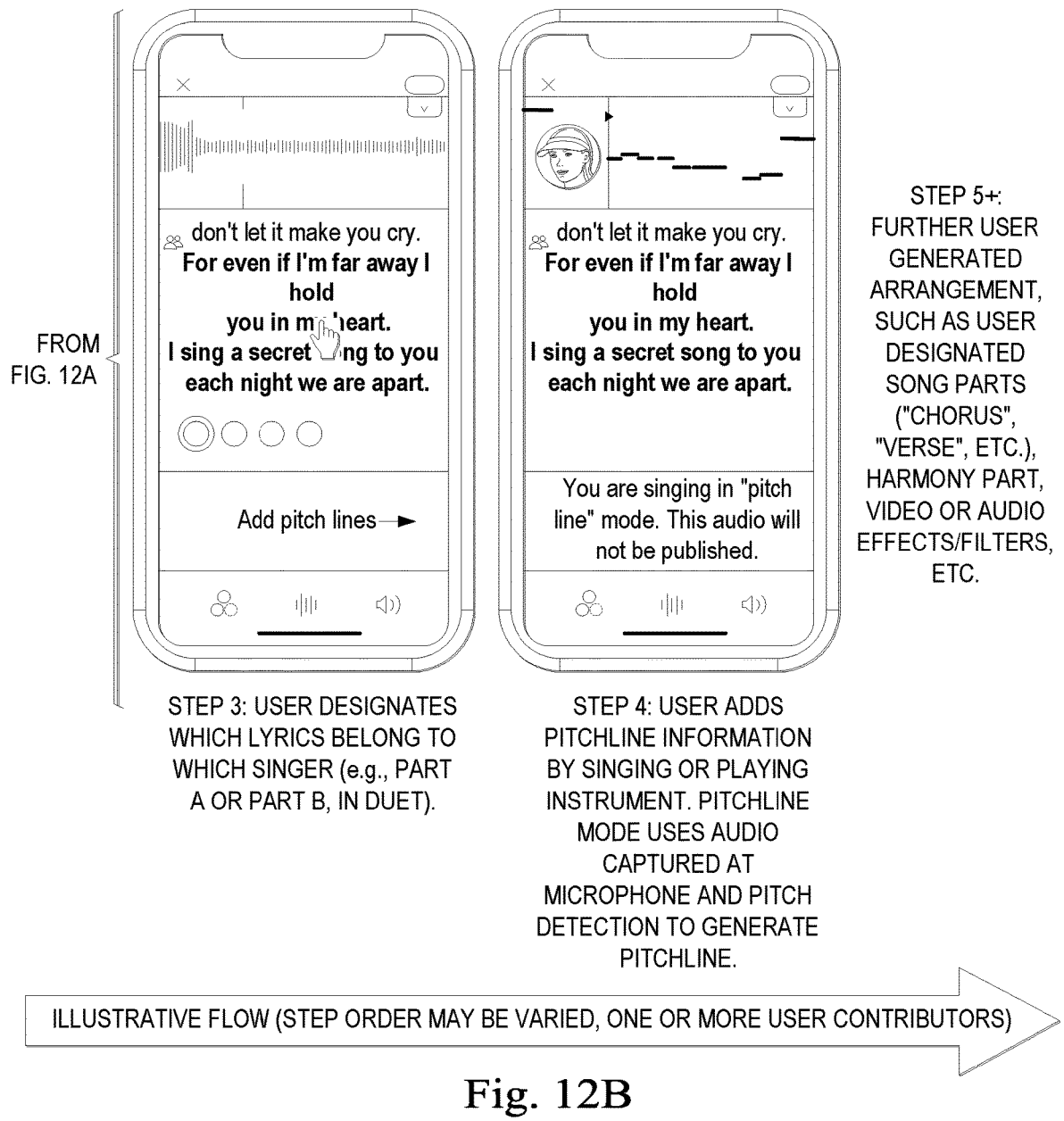

Freeform and collaborative arrangement creation processes are also envisioned. For example, as illustrated in FIG. 12, STEP 1, a user (user A) may perform and capture a freestyle mode performance, e.g., acoustic audio with performance synchronized video of a guitar performance. User A's initial freeform capture provides an initial seed for further collaboration. Next (in one illustrative flow), a user (e.g., user A or another user B) may enter lyrics (STEP 2) to accompany the audiovisual performance. Timeline editing and scrubbing facilities described herein can be particularly helpful in entering, manipulating and aligning entered lyrics to desired points in the performance timeline. Next (in the illustrated flow), a user (user A, B or another user C) may assign (STEP 3) particular lyric portions to singers (e.g., part A vs. part B in duet). More generally, larger numbers of vocal parts may be assigned in a group arrangement.

An advanced feature of the freeform and collaborative arrangement creation process illustrated in FIG. 12, STEP 4, for at least some embodiments, is provision of a pitch line capture mechanism, whereby an audio track is captured against a karaoke-style roll of the evolving performance timeline and used to compute a pitch track. In general, any of a variety of pitch detection techniques may be applied to compute a pitch track from captured audio. Vocal audio and musical instrument audio (e.g., from a piano) are both envisioned. In each case, compute pitch tracks are added to the performance timeline. Note that the user-generated arrangement need not be limited to lyrics and pitch lines. As an example (see STEP 5+), the media segment capture and edit platform may be extended to allow a user (user A, B, C or still another user D) to designate things like: song part ("Chorus", "Verse", etc.), harmony part, segment-based video or audio effects/filters, etc. Note also that, while ordered flow of FIG. 12 is illustrative, other embodiments may vary ordering of steps, omit steps or include additional steps appropriate to a particular freeform collaboration and particular audio or audiovisual work.

Short Seed, Short Segment and Other Variations

Though much of the foregoing description demonstrates the flexibility of non-linear segment capture and edit techniques in the context of full performance timelines, persons of skill in the art having benefit of the present disclosure will appreciate that collaboration seeds (or more generally short segments whether or not used as a collaboration seed) may, but need not, span a full audio (or audiovisual work). In some cases, a seed or user selection may be of full-length, spanning much or all of a pre-existing audio (or audiovisual) work. In some cases, a short seed or short segment or clip may be employed that spans less than all (and in some cases, much less than all) of the audio (or audiovisual) work. In general, whether a short segment, collection of short segments (a multi-segment) or a full-length audio (or audiovisual) work is selected, the selecting user-performer may capture a performance thereagainst or therewith. When, or if, used for a collaboration, the short-form or full-length content (lyrics, score, backing track, etc.) also forms the seed against which (or with which) further users may capture media content as part of the collaboration.

Figure 13:
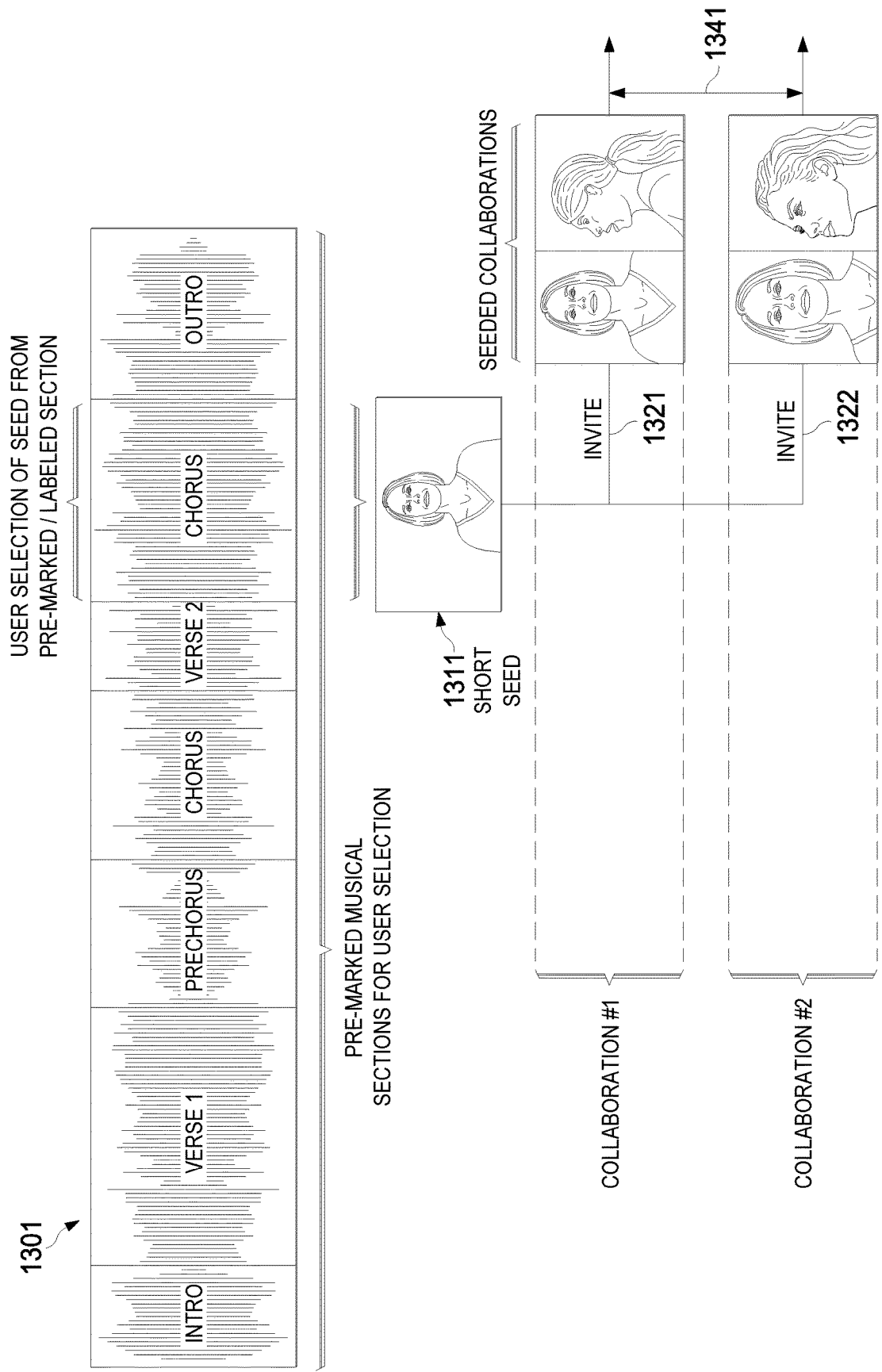
FIG. 13 illustrates a short seed collaboration flow in accordance with some embodiments of the present invention(s).

For example (as illustrated in FIG. 13), a verse, chorus, refrain, hook or other limited "chunk" of an audio (or audiovisual) work may constitute the seed for subsequent joins. Pre-marked portions (here musical sections) of an audio or audiovisual work 1301 may be selected by the seeding user. The resulting short seed 1311 constitutes the seed for multiple collaborations (here collabs #1 and #2). Whatever its extent or scope, the seed or seed portion/clip delimits the collaboration request (or call) for others to join. Typically, a call invites other users to join the full-length or short-form seed by singing along, singing a particular vocal part or musical section, singing harmony or other duet part, rapping, talking, clapping, recording video, adding a video clip from camera roll, etc. Invites 1321 and 1322 are illustrative in the short seed example of FIG. 13. The resulting group performance, whether full-length or just a chunk, may be posted, livestreamed, or otherwise disseminated (1341) in a social network.

For clarity, a short segment, collection of short segments (a multi-segment) or a full-length audio (or audiovisual) work may, but need not, seed a collaboration or further performance captures by other users. In some embodiments, the short segment, collection of short segments (a multi-segment) or a full-length audio (or audiovisual) work is simply used for solo performance capture. Accordingly, as used herein, the terms "short seed," "short-form seed," and "seed partial portion" denote a short segment that is also used (or usable) as the seed for a collaboration, whereas the terms "short segment" or "short-form content" and "partial portion" simply denote a partial portion of an audio (or audiovisual) work. In each case, computational techniques are employed to determine suitable partial portions of a full audio (or audiovisual) work for short-form performance capture.

In some embodiments, a short seed or short segment may be computationally generated based on a variety of inputs that are indexed (or indexable) to audio or audiovisual work 1301. For example, the temporal extent of a short seed or segment (as a portion or subset of the more complete audio or audiovisual work) may be computed by processing a set of vocal captures of user performances against the audio or audiovisual work. Loudness or spectral energy measures and/or pitch or timing correspondence with a vocal pitch track may be used select or threshold representative performances for inclusion in a sample or to weight contributions of individual performances of such a sample in the computation. Furthermore, as it has been observed that joint (sing together) portions the audio or audiovisual work provide high levels of user engagement, the foregoing computational methods may optionally be applied to select or favorably weight portions in the audio or audiovisual work that users have captured in duet or multipart chorus. Likewise, textual analysis of an associated lyrics track may be employed to identify repetition indicative of elements of musical structure such as chorus, refrain, hook or other repeated feature. In some cases, elements of musical structure may be associated (or associable) with the audio or audiovisual work based on user curation, upload metadata or professional or computationally-mediated annotations of a MIDI-encoded performance timeline. In some cases, computationally-determined musical information retrieval (MIR) features may be employed to identify recurring or distinctive elements of an audio or audiovisual work.

Figure 20:
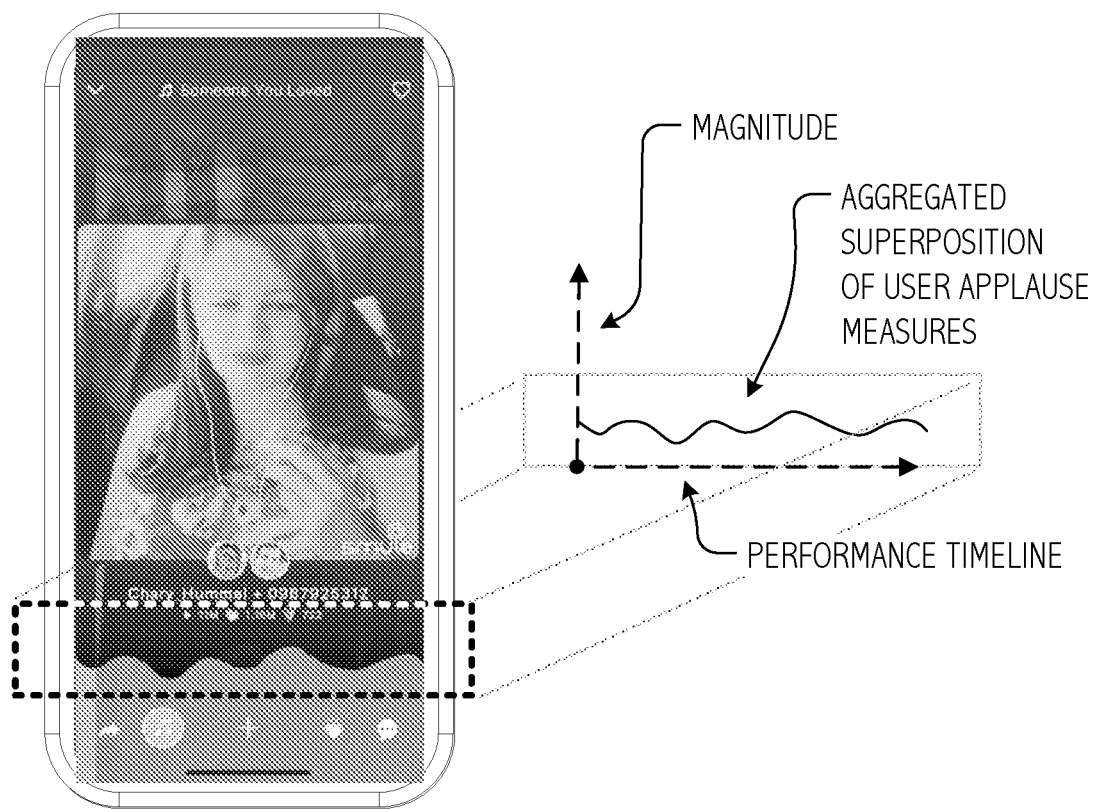
FIG. 20 depicts an exemplary user interface presentation of an applause measure aggregated from applause indications of a plurality of users.

In addition, or as an alternative, to computational analyses of the audio or audiovisual work itself or of user vocals captured thereagainst, some embodiments may leverage temporally indexed (or indexable) performer or non-performer engagement data. For example, points or portions of interest at which users opt to listen to user performances captured against an audible rendering of the audio or audiovisual work may be used to select or favorably weight portions for designation as a short seed or short segment. Likewise, points or portions of interest may be identified by an aggregated superposition of user applause measures that are temporally indexed (or indexable) to the audio or audiovisual work. Similarly, user interface indications that code "love," "like" or similar affirmation as part of a social media mechanic may be employed, as may user initiations of chat option, user forwarding of a particular clip or user-performer initiation of a further vocal capture. FIG. 20 depicts an exemplary user interface presentation of such an applause measure aggregated from applause indications of a plurality of users.

In general, the envisioned techniques may employ one, some or all of the foregoing in the selection of a short seed/segment, partial portion/clip or subset of the more complete audio or audiovisual work. The short seed/segment partial portion/clip may, in general, be computed using computational facilities of a content server or service platform and/or networked media capture devices. In some embodiments, temporal extent of short seed/segment partial portions (or clips) may be coded as begin/end timestamp metadata indexed to full audio or audiovisual work or explicit MIDI tracks aligned thereto and stored in a database mediated by content server or service platform. In some embodiments, short seed/segment partial portions (or clip) may be reduced to separately coded clips stored in a database mediated by the content server or service platform.

Building on the foregoing and without loss of generality, an exemplary set of techniques to generate or suggest a short seed/segment partial portion/clip includes:

Voicing Segmentation (Input 1): At collection point (typically a network-connected content or application service platform 110 with which media capture devices 101 are communicatively coupled, recall FIG. 1 et seq.), we gather and/or compute voicing segmentation data (describing when a singer is singing or not) from 10+ duet performances of arrangement. For each duet, we determine when both singers are singing at the same time, to create a "actual singing together" segmentation. These segmentations are aggregated and normalize to provide a representative segmentation of "actual singing together" for this song.

Repeating Lyric Segmentation (Input 2): We parse lyric lines from arrangement metadata and identify lines that match, and therefore portions that repeat, in lyrics that are or can by synchronized with an associated audio or audiovisual work. In general, the computation uses line similarity analysis with fuzzy matching to allow similar lines to match, even with homonyms or other slight variations. The computation finds the longest sequences of consecutive matching lines, and maps sequences back to their constituent lyric start and end times, creating a "repeating lyric" segmentation.

Community Sourced or Upload Metadata (Input 3): We parse labels or annotations such as "sing together" parts from arrangement metadata. In general, such metadata may be provided by a user community or the original media content uploader. Often, community sourced or upload metadata provides only coarse timing alignments to the associated audio or audiovisual work, but such metadata may nonetheless be employed if more precise arrangement metadata is unavailable. In some cases, statistical techniques may be applied to community sourced metadata to improve timing precision confidence.

Precise-Timed Arrangement Metadata (Input 4): When available, precise-timed arrangement metadata may be parsed to identify segments of the audio or audiovisual work that have already been pre-identified as musical sections, such as pre-chorus, chorus, or sing-together (in duet), that drive user collaboration and engagement.

Figure 18:
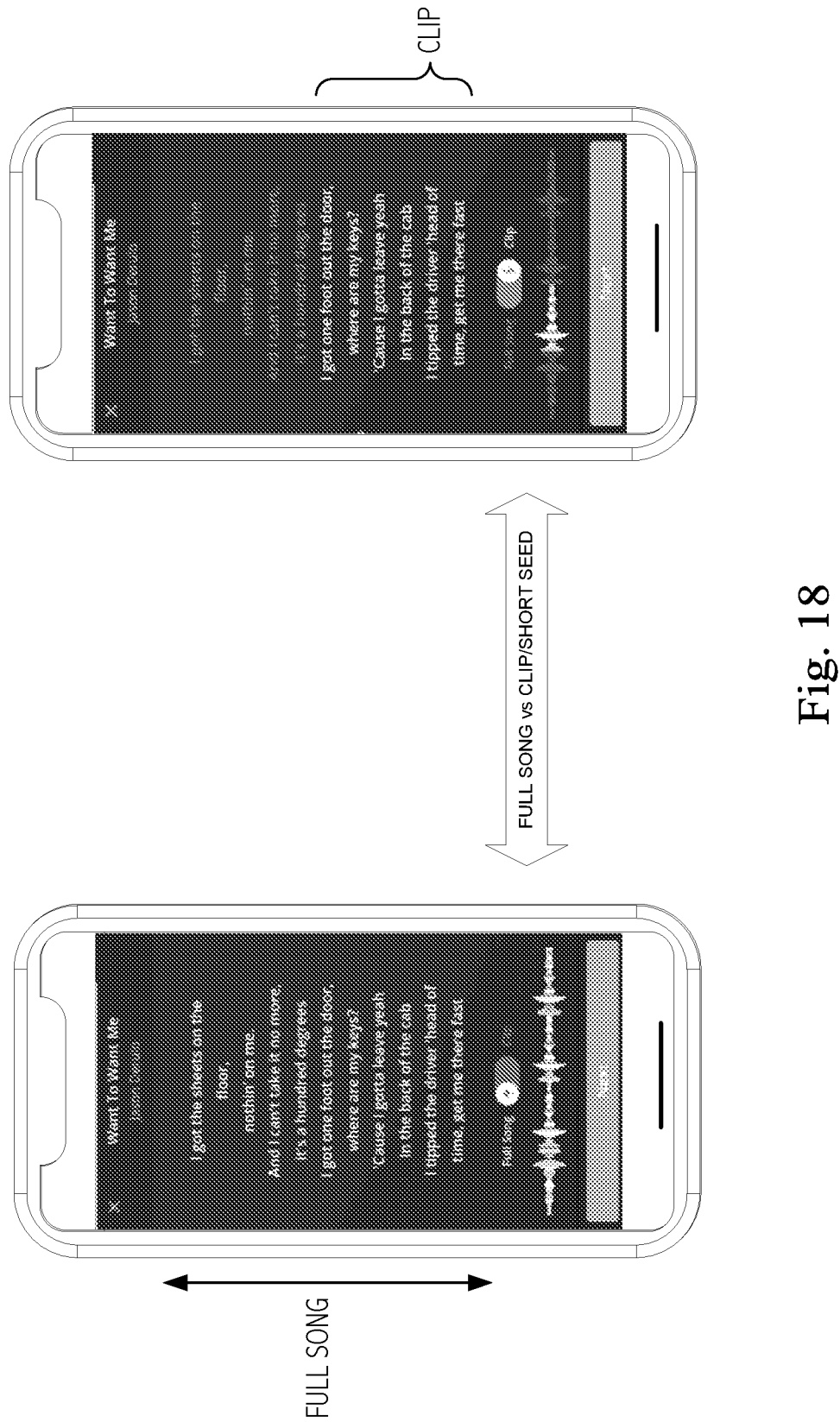
FIG. 18 illustrates a user interface option for selection, by a user-performer, of a short seed (or of a short-segment) vs. full song as an audio baseline for vocal capture.

In general, the short seed/segment generation techniques may merge segmentations from all inputs, optionally omitting (3) when (1) or (4) are available. From the merged segmentations, selection of the first segment meeting a minimum desired length threshold can provide a suitable short seed (or clip). If no such segment is found, there is no suggestion for this arrangement. Notably, short seed/segment generation computations may be repeated as additional performances, segmentations and metadata become available. Assuming that a suitable segment of at least minimum desired length is identified, it is typically desirable to trim (preferably at a segmentation boundary of some sort) to desired maximum length and to snap beginning and end to nearest lyric line timings. In some cases or embodiments, this is the suggested short seed/segment partial portion/clip supplied to or identified for vocal capture. Short seed vs. full song may be user selected by a user-performer as the audio baseline for vocal capture, as illustrated in FIG. 18. Note that while it is envisioned that short seed/segment partial portion/clip may be employed in a seed/join collaboration mechanic, it will also be appreciated by persons of skill in the art having benefit of the present disclosure that the short segment partial portion may also (or alternatively) be employed in solo performance capture.

Figure 19:
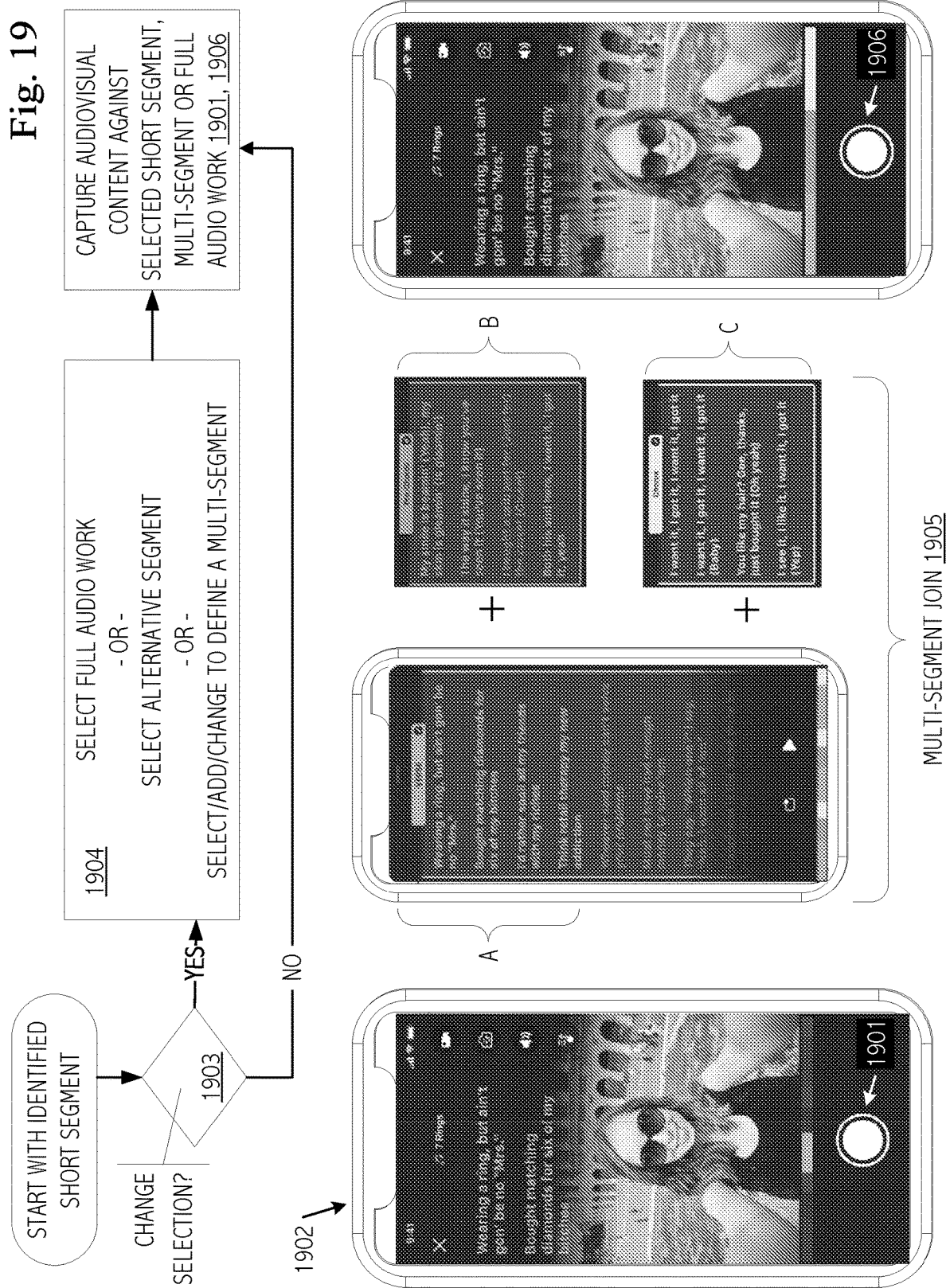
FIG. 19 depicts a user interface flow and corresponding exemplary user interface presentations for capture of audiovisual content against a pre-identified short segment or, alternatively, against user selected and joined short segments.

FIG. 19 depicts a user interface flow and corresponding exemplary user interface presentations for capture of audiovisual content against a pre-identified short segment or, alternatively, against user selected and joined short segments. In the illustrated flow, a user at a media capture device is presented with a pre-identified short segment that has been identified in accordance with one or more of the above-described computational techniques. The user may initiate (1901) audiovisual capture against the identified short segment 1902 initially selected for her or may change (1903) the selection. In the illustrated flow, the user may (at 1904) instead (i) select the full audio work, (ii) select an alternative segment identified in accordance with one or more of the above-described computational techniques or (iii) select alternative or additional segment(s) and/or change selected segments identified in accordance with one or more of the above-described computational techniques to define a multi-segment join 1905. After such an selection, user may initiate (1906) audiovisual capture against the full audio work, the alternative short segment or the multi-segment join consistent with her selection 1904.

In some cases or embodiments, a seed/segment partial portion/clip may be selected (or further refined) by human user using scrubbing techniques that allow forward and backward traversal of audiovisual content, optionally including pitch cues, waveform- or envelope-type performance timelines, lyrics, video and/or other temporally-synchronized content at record-time, during edits, and/or in playback. In this way, recapture of selected performance portions, coordination of group parts, and overdubbing may all be facilitated. Direct scrolling to arbitrary points in the performance timeline, lyrics, pitch cues and other temporally-synchronized content allows user to conveniently move through a capture or audiovisual edit session. For selections or embodiments that involve short seeds/segments (or clips), scrubbing techniques may be employed to define start and stop points that delimit a particular portion or chunk. Likewise, in the case of full-length seeds, scrubbing techniques may be employed to define start and stop points that delimit portions of a performance timeline to which a joiner is invited to contribute.

In some cases, the user vocalist may be guided through the performance timeline, lyrics, pitch cues and other temporally-synchronized content in correspondence with group part information such as in a guided short-form capture for a duet. A scrubber allows user vocalists to conveniently move forward and backward through the temporally-synchronized content. In some cases, temporally synchronized video capture and/or playback is also supported in connection with the scrubber. Note that while scrubbing may be provided for synchronized traversal of multiple media lines (e.g., backing audio, vocals, lyrics, pitch cue and/or group part information), single-medium scrubbing is also envisioned.

Scrubbing techniques need not be employed in all cases or embodiments. Portions of a performance timeline (often portions that correspond to musical sections) may be marked and labelled for user selection. Marking/labeling may be based on human or automated sources. For example, particular portions may be marked or labelled by a user that originally uploads a track or corresponding lyrics or by a media content curator. In a complementary fashion or alternatively, particular portions may be marked or labelled by a machine learning robot trained to identify section and boundaries (e.g., from an audio backing or vocal track, lyrics or based on crowd-sourced data such as where user tend to sing the most or most loudly). These and other variations will be appreciated by persons of skill in the art having benefit of the present disclosure.

Exemplary Audiovisual Processing Flows, Devices and Systems

Figure 14:
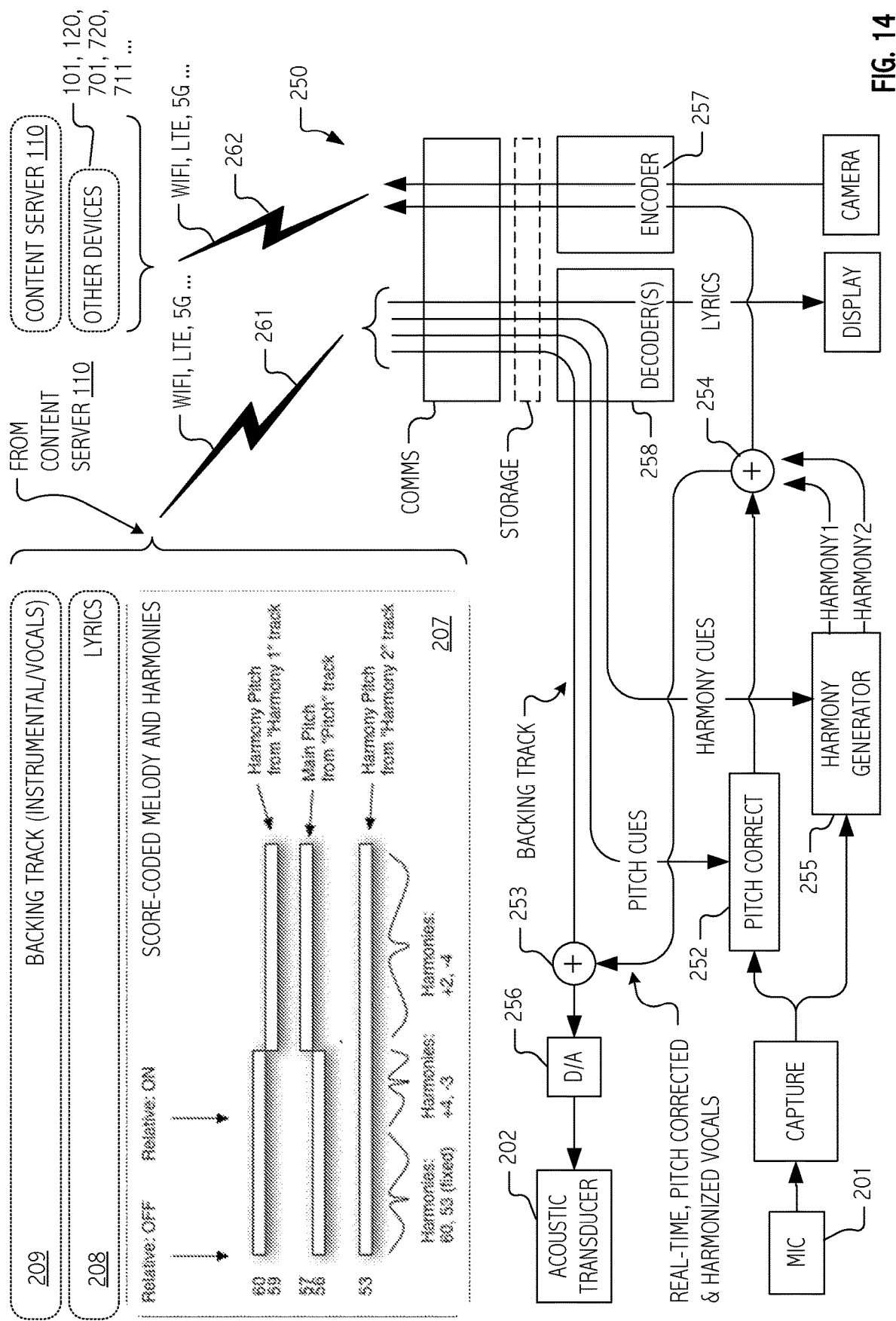
FIGS. 14 and 15 illustrate exemplary techniques for capture, coordination and/or mixing of audiovisual content.
Figure 15:
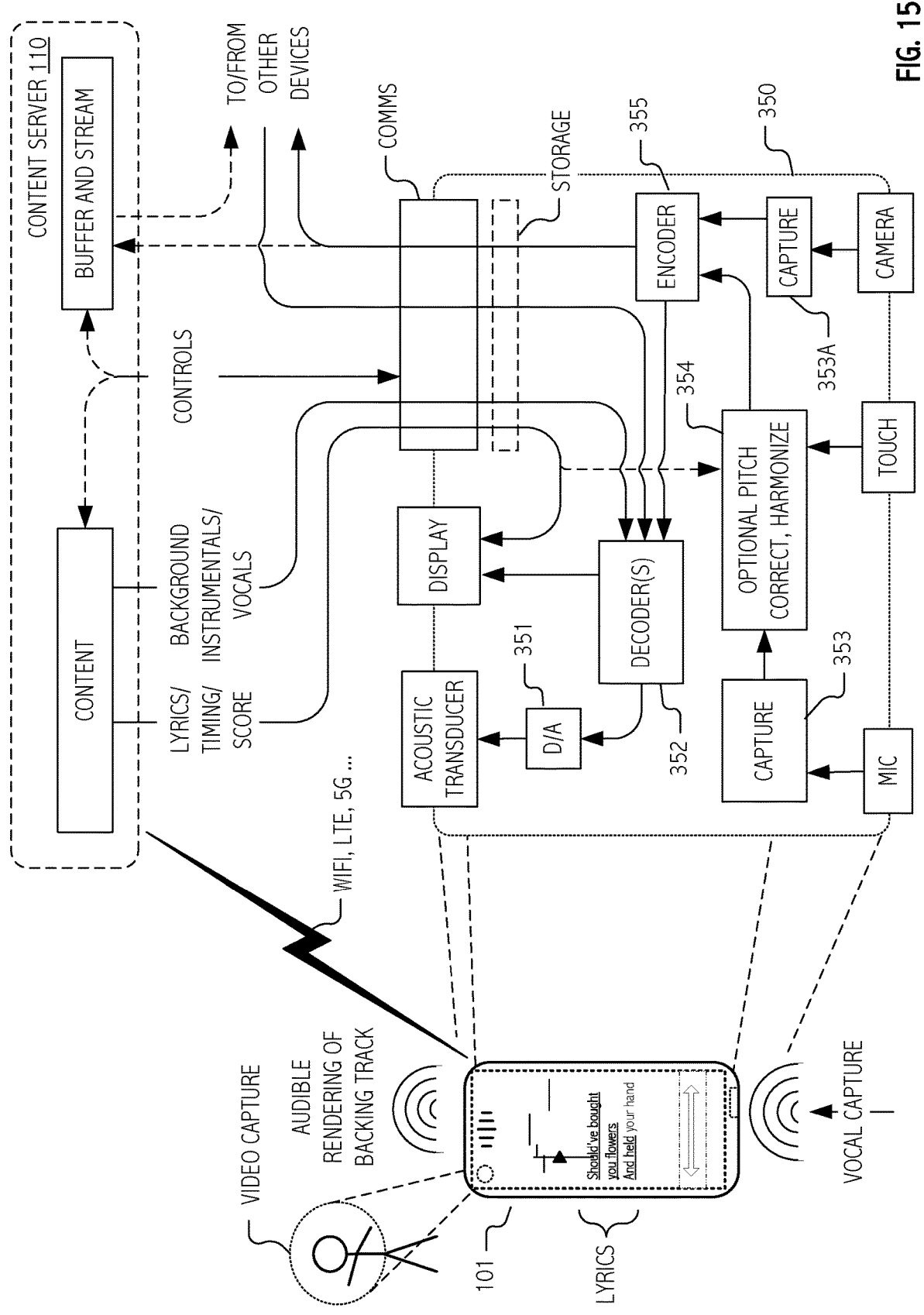

FIGS. 14 and 15 illustrate exemplary techniques for capture, coordination and/or mixing of audiovisual content for geographically distributed performers. Specifically, FIG. 14 is a flow diagram illustrating real-time continuous score-coded pitch-correction and harmony generation for a captured vocal performance in accordance with some embodiments of the present invention. In the illustrated configuration, a user/vocalist sings along with a backing track, karaoke style. Vocals captured (251) from a microphone input 201 are continuously pitch-corrected (252) and harmonized (255) in real-time for mix (253) with the backing track which is audibly rendered at one or more acoustic transducers 202.

Both pitch correction and added harmonies are chosen to correspond to a score 207, which in the illustrated configuration, is wirelessly communicated (261) to the device(s) (e.g., from content server 110 to handheld 101, recall FIG. 1, or set-top box equipment) on which vocal capture and pitch-correction is to be performed, together with lyrics 208 and an audio encoding of the backing track 209. In some embodiments of techniques described herein, the note (in a current scale or key) that is closest to that sounded by the user/vocalist is determined based on score 207. While this closest note may typically be a main pitch corresponding to the score-coded vocal melody, it need not be. Indeed, in some cases, the user/vocalist may intend to sing harmony and the sounded notes may more closely approximate a harmony track.

In some embodiments, capture of vocal audio and performance synchronized video may be performed using facilities of television-type display and/or set-top box equipment. However, in other embodiments, a handheld device (e.g., handheld device 301) may itself support capture of both vocal audio and performance synchronized video. Thus, FIG. 15 illustrates basic signal processing flows (350) in accord with certain implementations suitable for a mobile phone-type handheld device 301 to capture vocal audio and performance synchronized video, to generate pitch-corrected and optionally harmonized vocals for audible rendering (locally and/or at a remote target device), and to communicate with a content server or service platform 310.

Based on the description herein, persons of ordinary skill in the art will appreciate suitable allocations of signal processing techniques (sampling, filtering, decimation, etc.) and data representations to functional blocks (e.g., decoder(s) 352, digital-to-analog (D/A) converter 351, capture 353, 353A and encoder 355) of a software executable to provide signal processing flows 350 illustrated in FIG. 15. Likewise, relative to FIG. 14, the signal processing flows 250 and illustrative score coded note targets (including harmony note targets), persons of ordinary skill in the art will appreciate suitable allocations of signal processing techniques and data representations to functional blocks and signal processing constructs (e.g., decoder(s) 258, capture 251, digital-to-analog (D/A) converter 256, mixers 253, 254, and encoder 257) implemented at least in part as software executable on a handheld or other portable computing device.

As will be appreciated by persons of ordinary skill in the art, pitch-detection and pitch-correction have a rich technological history in the music and voice coding arts. Indeed, a wide variety of feature picking, time-domain and even frequency-domain techniques have been employed in the art and may be employed in some embodiments in accord with the present invention. In some embodiments in accordance with the present inventions, pitch-detection methods calculate an average magnitude difference function (AMDF) and execute logic to pick a peak that corresponds to an estimate of the pitch period. Building on such estimates, pitch shift overlap add (PSOLA) techniques are used to facilitate resampling of a waveform to produce a pitch-shifted variant while reducing aperiodic effects of a splice. Implementations based on AMDF/PSOLA techniques are described in greater detail in commonly-owned, U.S. Pat. No. 8,983,829, entitled "COORDINATING AND MIXING VOCALS CAPTURED FROM GEOGRAPHICALLY DISTRIBUTED PERFORMERS," and naming Cook, Lazier, Lieber, and Kirk as inventors.

Figure 16:
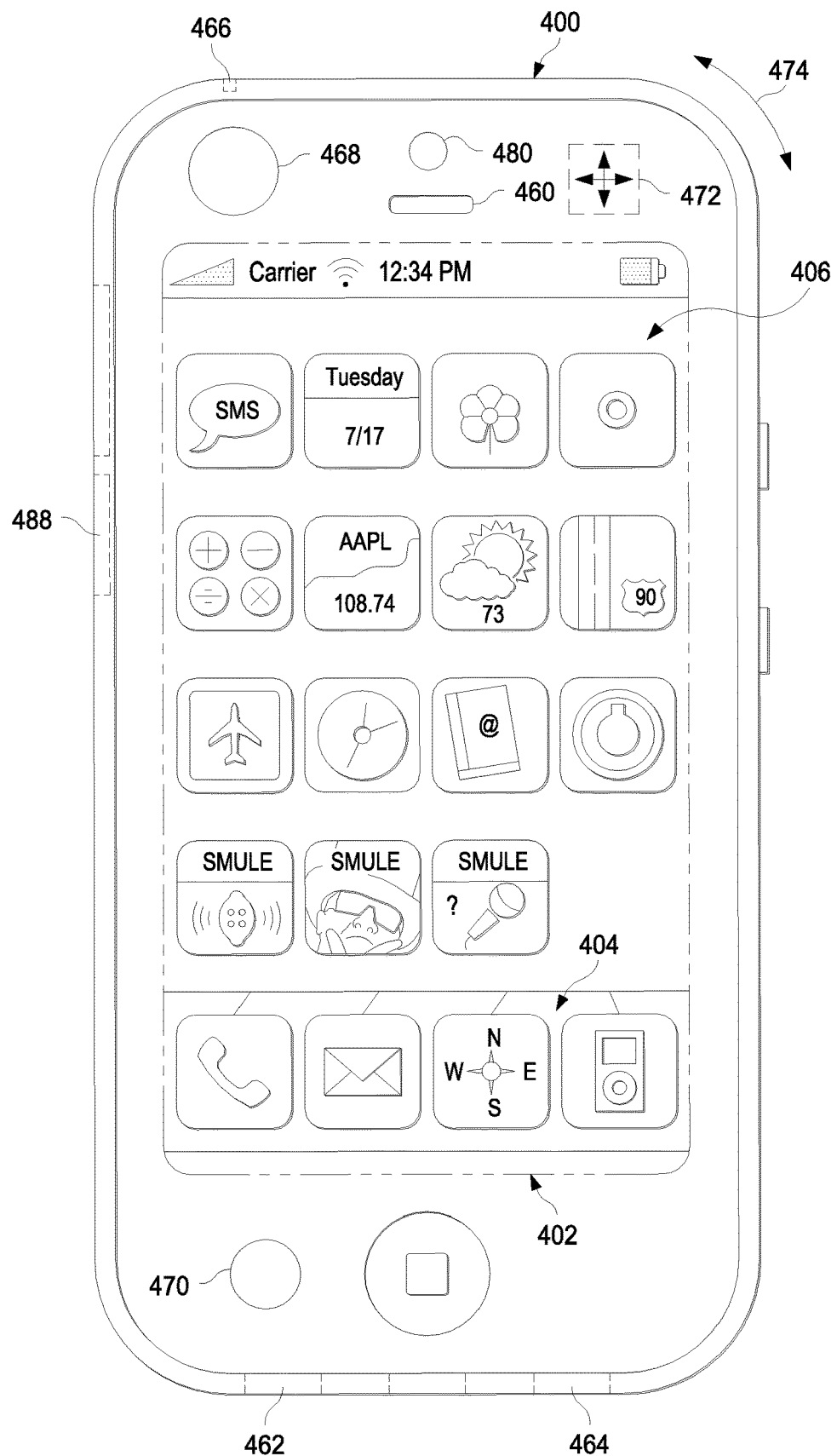
FIG. 16 illustrates features of a mobile phone type device that may serve as a platform for execution of software implementations in accordance with some embodiments of the present invention(s).

FIG. 16 illustrates features of a mobile device that may serve as a platform for execution of software implementations in accordance with some embodiments of the present invention. More specifically, FIG. 16 is a block diagram of a mobile device 400 that is generally consistent with commercially-available versions of an iPhone™ mobile digital device. Although embodiments of the present invention are certainly not limited to iPhone deployments or applications (or even to iPhone-type devices), the iPhone device platform, together with its rich complement of sensors, multimedia facilities, application programmer interfaces and wireless application delivery model, provides a highly capable platform on which to deploy certain implementations. Based on the description herein, persons of ordinary skill in the art will appreciate a wide range of additional mobile device platforms that may be suitable (now or hereafter) for a given implementation or deployment of the inventive techniques described herein.

Summarizing briefly, mobile device 400 includes a display 402 that can be sensitive to haptic and/or tactile contact with a user. Touch-sensitive display 402 can support multi-touch features, processing multiple simultaneous touch points, including processing data related to the pressure, degree and/or position of each touch point. Such processing facilitates gestures and interactions with multiple fingers and other interactions. Of course, other touch-sensitive display technologies can also be used, e.g., a display in which contact is made using a stylus or other pointing device.

Typically, mobile device 400 presents a graphical user interface on the touch-sensitive display 402, providing the user access to various system objects and for conveying information. In some implementations, the graphical user interface can include one or more display objects 404, 406. In the example shown, the display objects 404, 406, are graphic representations of system objects. Examples of system objects include device functions, applications, windows, files, alerts, events, or other identifiable system objects. In some embodiments of the present invention, applications, when executed, provide at least some of the digital acoustic functionality described herein.

Typically, the mobile device 400 supports network connectivity including, for example, both mobile radio and wireless internetworking functionality to enable the user to travel with the mobile device 400 and its associated network-enabled functions. In some cases, the mobile device 400 can interact with other devices in the vicinity (e.g., via Wi-Fi, Bluetooth, etc.). For example, mobile device 400 can be configured to interact with peers or a base station for one or more devices. As such, mobile device 400 may grant or deny network access to other wireless devices.

Mobile device 400 includes a variety of input/output (I/O) devices, sensors and transducers. For example, a speaker 460 and a microphone 462 are typically included to facilitate audio, such as the capture of vocal performances and audible rendering of backing tracks and mixed pitch-corrected vocal performances as described elsewhere herein. In some embodiments of the present invention, speaker 460 and microphone 662 may provide appropriate transducers for techniques described herein. An external speaker port 464 can be included to facilitate hands-free voice functionalities, such as speaker phone functions. An audio jack 466 can also be included for use of headphones and/or a microphone. In some embodiments, an external speaker and/or microphone may be used as a transducer for the techniques described herein.

Other sensors can also be used or provided. A proximity sensor 468 can be included to facilitate the detection of user positioning of mobile device 400. In some implementations, an ambient light sensor 470 can be utilized to facilitate adjusting brightness of the touch-sensitive display 402. An accelerometer 472 can be utilized to detect movement of mobile device 400, as indicated by the directional arrow 474. Accordingly, display objects and/or media can be presented according to a detected orientation, e.g., portrait or landscape. In some implementations, mobile device 400 may include circuitry and sensors for supporting a location determining capability, such as that provided by the global positioning system (GPS) or other positioning systems (e.g., systems using Wi-Fi access points, television signals, cellular grids, Uniform Resource Locators (URLs)) to facilitate geocodings described herein. Mobile device 400 also includes a camera lens and imaging sensor 480. In some implementations, instances of a camera lens and sensor 480 are located on front and back surfaces of the mobile device 400. The cameras allow capture still images and/or video for association with captured pitch-corrected vocals.

Mobile device 400 can also include one or more wireless communication subsystems, such as an 802.11b/g/n/ac communication device, and/or a Bluetooth™ communication device 488. Other communication protocols can also be supported, including other 802.x communication protocols (e.g., WiMax, Wi-Fi, 3G), fourth or fifth generation protocols and modulations (4G-LTE, 5G), code division multiple access (CDMA), global system for mobile communications (GSM), Enhanced Data GSM Environment (EDGE), etc. A port device 490, e.g., a Universal Serial Bus (USB) port, or a docking port, or some other wired port connection, can be included and used to establish a wired connection to other computing devices, such as other communication devices 400, network access devices, a personal computer, a printer, or other processing devices capable of receiving and/or transmitting data. Port device 490 may also allow mobile device 400 to synchronize with a host device using one or more protocols, such as, for example, the TCP/IP, HTTP, UDP and any other known protocol.

Figure 17:
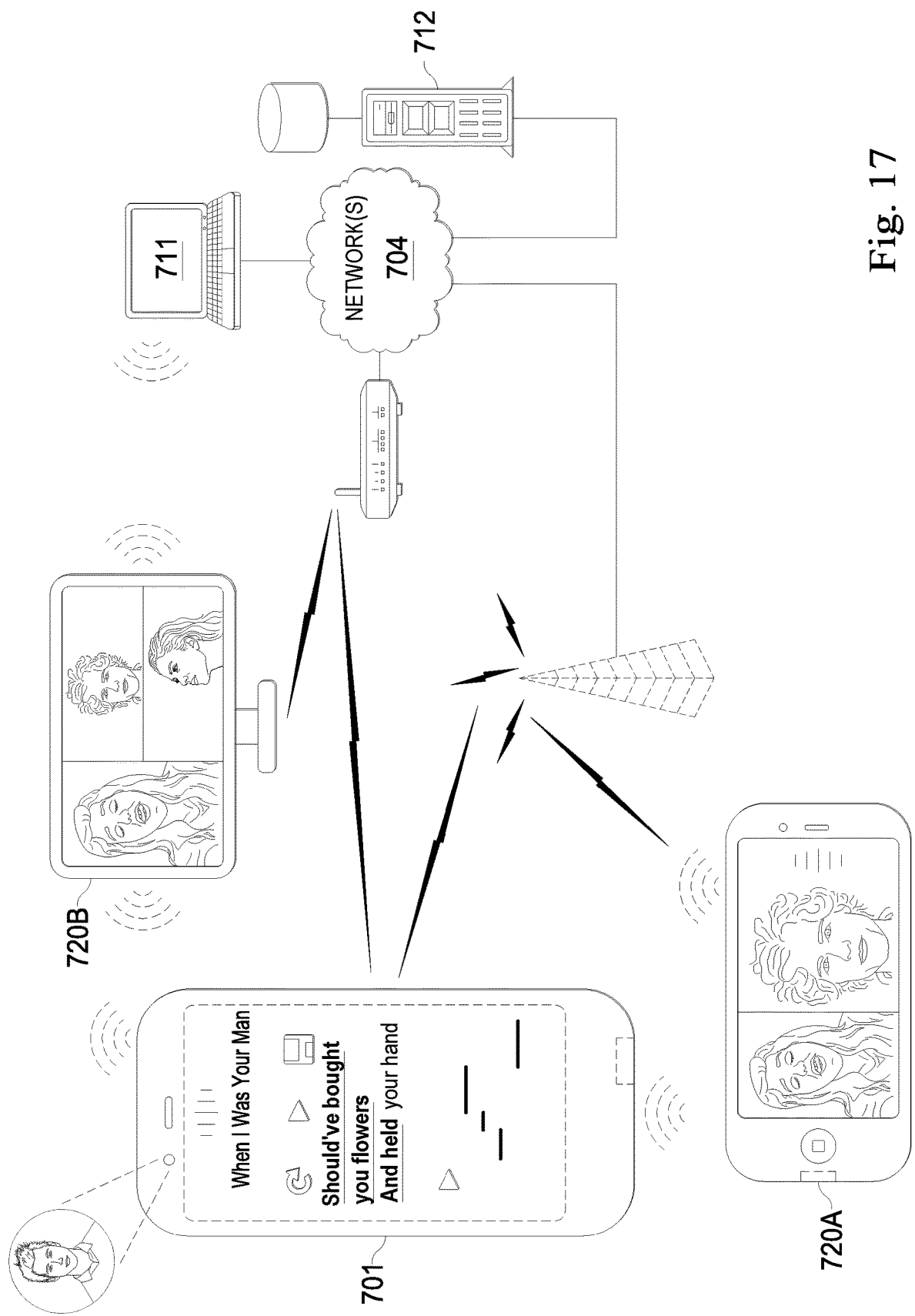
FIG. 17 illustrates a system in which devices and related service platforms may operate in accordance with some embodiments of the present invention(s).

FIG. 17 illustrates respective instances (501 and 520) of a portable computing device such as mobile device 400 programmed with vocal audio and video capture code, user interface code, pitch correction code, an audio rendering pipeline and playback code in accord with the functional descriptions herein. Device instance 501 is depicted operating in a vocal audio and performance synchronized video capture mode, while device instance 520 operates in a presentation or playback mode for a mixed audiovisual performance. A television-type display and/or set-top box equipment 520A is likewise depicted operating in a presentation or playback mode, although as described elsewhere herein, such equipment may also operate as part of a vocal audio and performance synchronized video capture facility. Each of the aforementioned devices communicate via wireless data transport and/or intervening networks 504 with a server 512 or service platform that hosts storage and/or functionality explained herein with regard to content server 110, 210. Captured, pitch-corrected vocal performances with performance synchronized video capture using techniques described herein may (optionally) be streamed and audiovisually rendered at laptop computer 511.

Other Embodiments

While the invention(s) is (are) described with reference to various embodiments, it will be understood that these embodiments are illustrative and that the scope of the invention(s) is not limited to them. Many variations, modifications, additions, and improvements are possible. For example, while pitch correction vocal performances captured in accord with a karaoke-style interface have been described, other variations will be appreciated. Furthermore, while certain illustrative signal processing techniques have been described in the context of certain illustrative applications, persons of ordinary skill in the art will recognize that it is straightforward to modify the described techniques to accommodate other suitable signal processing techniques and effects.

Embodiments in accordance with the present invention may take the form of, and/or be provided as, a computer program product encoded in a machine-readable medium as instruction sequences and other functional constructs of software, which may in turn be executed in a computational system (such as a iPhone handheld, mobile or portable computing device, media application platform, set-top box, or content server platform) to perform methods described herein. In general, a machine readable medium can include tangible articles that encode information in a form (e.g., as applications, source or object code, functionally descriptive information, etc.) readable by a machine (e.g., a computer, computational facilities of a mobile or portable computing device, media device or streamer, etc.) as well as non-transitory storage incident to transmission of the information. A machine-readable medium may include, but need not be limited to, magnetic storage medium (e.g., disks and/or tape storage); optical storage medium (e.g., CD-ROM, DVD, etc.); magneto-optical storage medium; read only memory (ROM); random access memory (RAM); erasable programmable memory (e.g., EPROM and EEPROM); flash memory; or other types of medium suitable for storing electronic instructions, operation sequences, functionally descriptive information encodings, etc.

In general, plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the invention(s).

What is claimed is:

1. A system comprising:
   a service platform; and
   plural media capture devices communicatively coupled via respective network communication interfaces to the service platform for media capture relative to a media encoding of an audio work, the media capture devices providing respective users thereof with a user interface for selecting from amongst performance capture options that include one or more partial portions of the audio work identified to the respective media capture devices by the service platform,
   wherein the service platform identifies individual ones of the partial portions based on one or more of:
      (i) musical structure coded for the audio work;
      (ii) a machine learning algorithm applied to backing audio, vocal audio or lyrics of or corresponding to audiovisual performances captured against the audio work; and
      (iii) crowd-sourced point- or portion-of-interest data measured for performer and/or non-performer user engagement with the audio work, and
   wherein the media capture devices are configured to capture at least vocal audio of the respective users performed against audible renderings on the respective media capture devices of respectively selected partial portions of the audio work.

2. The system of claim 1,
   wherein the performance capture options selectable by the respective users include the full audio work.

3. The system of claim 1,
wherein the performance capture options selectable by the respective users at respective of the media capture devices include multiple individual partial portions of the audio work identified by the service platform.

4. The system of claim 1,
wherein the performance capture options selectable by the respective users at respective of the media capture devices include a user-defined join of multiple of the partial portions of the audio work identified by the service platform, the user-defined join constituting less than the full audio work.

5. The system of claim 1,
wherein temporal extent of the identified one or more partial portions is determined, at least in part, based on computational evaluation of vocal captures of plural user performances against audible renderings of the audio work on respective of the media capture devices to identify particular portions of the full audio work against which pluralities of the users sing together.

6. The system of claim 1,
wherein temporal extent of the identified one or more partial portions is determined, at least in part, based on computational evaluation of vocal captures of plural user performances against audible renderings of the audio work on respective of the media capture devices to identify particular portions of the full audio work against which individual users sing most loudly or with greatest pitch or timing correspondence with a vocal pitch track for the audio work.

7. The system of claim 1,
wherein temporal extent of the identified one or more partial portions is determined, at least in part, based on computational analysis of a lyric track for the audio work to identify repetition indicative of a chorus, refrain, hook or other repeated vocal element.

8. The system of claim 1,
wherein temporal extent of the identified one or more partial portions is determined, at least in part, based on music information retrieval (MIR) features extracted from at least a backing track of the audio work to identify similarity indicative of a chorus, refrain, hook or other recurring or distinctive elements of musical structure.

9. The system of claim 1,
wherein temporal extent of the identified one or more partial portions is determined, at least in part, based on visual features extracted from performance synchronized video.

10. The system of claim 1,
wherein temporal extent of the identified one or more partial portions is determined, at least in part, based on measured performer or non-performer user engagement indicia.

11. The system of claim 10, wherein the measured performer or non-performer user engagement indicia include one or more of:
points or portions of interest at which users opt to listen to user performances captured against an audible rendering of the audio work;
points or portions of interest for which users express a love or like using a social media mechanic;
points or portions of interest identified based on an aggregated superposition of user applause measures temporally indexed to the audio work; and
points or portions of interest for which users initiate a chat, forward a clip or initiate a vocal capture.

12. The system of claim 1,
wherein temporal extent of the identified one or more partial portions is determined, at least in part, based on user curation or uploader metadata capture that labels or marks particular portions of the audio work.

13. The system of claim 1,
wherein the partial portion selected by a first user at a first one of the media capture devices is communicated to a second one of the media capture devices as a seed partial portion against which a second user of the second media capture device captures media content.

14. A system comprising:
a service platform; and
plural media capture devices communicatively coupled via respective network communication interfaces to the service platform for media capture relative to a media encoding of an audio work, the media capture devices providing respective users thereof with a user interface for selecting from amongst performance capture options that include the full audio work and one or more partial portions of the audio work identified to the respective media capture devices by the service platform,
wherein the service platform identifies individual ones of the partial portions based on crowd-sourced point- or portion-of-interest data measured for performer and/or non-performer user engagement with the audio work, and
wherein the media capture devices are configured to capture at least vocal audio of the respective users performed against audible renderings on the respective media capture devices of respectively selected partial portions of the audio work.

15. The system of claim 14,
wherein the service platform further identifies individual ones of the partial portions based on musical structure coded for the audio work.

16. The system of claim 14,
wherein the service platform further identifies individual ones of the partial portions based on a machine learning algorithm applied to backing audio, vocal audio or lyrics of or corresponding to audiovisual performances captured against the audio work.

17. The system of claim 14,
wherein the performance capture options selectable by the respective users at respective of the media capture devices include multiple individual partial portions of the audio work identified by the service platform.

18. The system of claim 14,
wherein the performance capture options selectable by the respective users at respective of the media capture devices include a user-defined join of multiple of the partial portions of the audio work identified by the service platform, the user-defined join constituting less than the full audio work.

19. The system of claim 14,
wherein temporal extent of the identified one or more partial portions is determined, at least in part, based on computational evaluation of vocal captures of plural user performances against audible renderings of the audio work on respective of the media capture devices to identify particular portions of the full audio work against which pluralities of the users sing together.

20. The system of claim 14,
wherein temporal extent of the identified one or more partial portions is determined, at least in part, based on computational analysis of a lyric track for the audio work to identify repetition indicative of a chorus, refrain, hook or other repeated vocal element.

21. The system of claim 14,
wherein temporal exYetent of the identified one or more partial portions is determined, at least in part, based on music information retrieval (MIR) features extracted from at least a backing track of the audio work to identify similarity indicative of a chorus, refrain, hook or other recurring or distinctive elements of musical structure.

* * * * *